United States Patent
Ogawa et al.

(10) Patent No.: US 10,498,522 B2
(45) Date of Patent: Dec. 3, 2019

(54) SENSOR, CONTROLLER, AND METHOD FOR OBTAINING MOTOR-RELATED INFORMATION

(71) Applicant: KABUSHIKI KAISHA YASKAWA DENKI, Kitakyushu-shi (JP)

(72) Inventors: Kunihiko Ogawa, Kitakyushu (JP); Ryota Moriwaka, Kitakyushu (JP); Yasuhiro Matsutani, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 819 days.

(21) Appl. No.: 15/159,815

(22) Filed: May 20, 2016

(65) Prior Publication Data

US 2016/0344266 A1  Nov. 24, 2016

(30) Foreign Application Priority Data

May 22, 2015  (JP) ................................. 2015-104865

(51) Int. Cl.
  *H04L 5/16*  (2006.01)
  *H04L 29/08*  (2006.01)

(52) U.S. Cl.
  CPC ................ *H04L 5/16* (2013.01); *H04L 67/12* (2013.01)

(58) Field of Classification Search
  CPC .......... B25J 19/02; B25J 19/021; B25J 9/163; G01D 5/24447; G01D 5/2451;
  (Continued)

(56) References Cited

U.S. PATENT DOCUMENTS 5,912,541 A * 6/1999 Bigler .................. H02K 11/215
  318/538
9,603,043 B2 * 3/2017 Choi ..................... H04W 24/10
  (Continued)

FOREIGN PATENT DOCUMENTS

JP  2008-228179  9/2008
JP  2009-021700  1/2009
  (Continued)

OTHER PUBLICATIONS

English Translation of JP2013084111 (Year: 2013).*
  (Continued)

*Primary Examiner* — Bickey Dhakal
*Assistant Examiner* — Zoheb S Imtiaz
(74) *Attorney, Agent, or Firm* — Mori & Ward, LLP

(57) ABSTRACT

A sensor includes an upper-level connection port, a lower-level connection port, a command receiver, a wait time period setter, and a motor-related information obtainer. The upper-level connection port is configured to communicate with an upper-level sensor or an upper-level controller. The lower-level connection port is configured to communicate with a lower-level sensor. The command receiver is configured to receive a command from the upper-level controller. The wait time period setter is configured to set a wait time period based on an order of connection of at least the upper-level sensor or the upper-level controller, the sensor, and the lower-level sensor. The motor-related information obtainer is configured to obtain motor-related information, which relates to a motor, at a timing determined by the command and at a timing based on the wait time period.

16 Claims, 13 Drawing Sheets

(58) Field of Classification Search
CPC .......... G01D 5/245; G05B 2219/37297; G05B 2219/41279; G05B 2219/41285; G05B 2219/42284; G05B 19/0423; G05B 19/404; G05B 19/4061; G05B 2219/37624; G05B 2219/39195; G05B 2219/40547

See application file for complete search history.

(56) References Cited

U.S. PATENT DOCUMENTS

| | | |
|---|---|---|
| 2009/0019129 A1 | 1/2009 | Suzuki |
| 2011/0241447 A1 | 10/2011 | Ando et al. |
| 2013/0293251 A1 | 11/2013 | Martin et al. |
| 2013/0294222 A1 | 11/2013 | Martin et al. |
| 2013/0294529 A1 | 11/2013 | Martin et al. |
| 2013/0294530 A1 | 11/2013 | Martin et al. |
| 2013/0297954 A1 | 11/2013 | Martin et al. |
| 2015/0100159 A1* | 4/2015 | Park .......................... H02K 7/14 700/258 |
| 2015/0168477 A1 | 6/2015 | Martin et al. |
| 2016/0025795 A1 | 1/2016 | Martin et al. |

FOREIGN PATENT DOCUMENTS

| | | |
|---|---|---|
| JP | 2011-229359 | 11/2011 |
| JP | 2013-084111 | 5/2013 |
| JP | 2013084111 A * | 5/2013 |
| JP | 2013-236372 | 11/2013 |

OTHER PUBLICATIONS

Japanese Office Action for corresponding JP Application No. 2015-104865, dated Nov. 14, 2017 (w/ English machine translation).

* cited by examiner

*Motor position information obtainment command

FIG. 4

| Encoders | Specified wait time periods |
|----------|------------------------------|
| 1 | $T_{W1}$ |
| 2 | $T_{W2}$ |
| 3 | $T_{W3}$ |
| 4 | $T_{W4}$ |
| 5 | $T_{W5}$ |
| 6 | $T_{W6}$ |
| 7 | $T_{W7}$ |

# SENSOR, CONTROLLER, AND METHOD FOR OBTAINING MOTOR-RELATED INFORMATION

CROSS-REFERENCE TO RELATED APPLICATIONS

The present application claims priority under 35 U.S.C. § 119 to Japanese Patent Application No. 2015-104865, filed May 22, 2015. The contents of this application are incorporated herein by reference in their entirety.

BACKGROUND

Field of the Invention

The embodiments disclosed herein relate to a sensor, a controller, and a method for obtaining motor-related information.

Discussion of the Background

Japanese Unexamined Patent Application Publication No. 2011-229359 discloses a motor control system that includes a controller, a motor controller, and a sensor. The controller instructs the motor controller to control a motor. The sensor obtains motor-related information (an example of the sensor being an encoder that obtains the position of the motor). The sensor receives a command from the controller and executes the command. Then, the sensor sends motor-related information to the controller.

SUMMARY

According to one aspect of the present disclosure, a sensor includes an upper-level connection port, a lower-level connection port, a command receiver, a wait time period setter, and a motor-related information obtainer. The upper-level connection port is configured to communicate with an upper-level sensor or an upper-level controller. The lower-level connection port is configured to communicate with a lower-level sensor. The command receiver is configured to receive a command from the upper-level controller. The wait time period setter is configured to set a wait time period based on an order of connection of at least the upper-level sensor or the upper-level controller, the sensor, and the lower-level sensor. The motor-related information obtainer is configured to obtain motor-related information, which relates to a motor, at a timing determined by the command and at a timing based on the wait time period.

According to another aspect of the present disclosure, a controller includes a connection port and an initialization command sender. The connection port is configured to communicate with a sensor. The sensor includes an upper-level connection port, a lower-level connection port, a command receiver, a wait time period setter, and a motor-related information obtainer. The upper-level connection port is configured to communicate with an upper-level sensor or an upper-level controller. The lower-level connection port is configured to communicate with a lower-level sensor. The command receiver is configured to receive a command from the upper-level controller. The wait time period setter is configured to set a wait time period based on an order of connection of at least the upper-level sensor or the upper-level controller, the sensor, and the lower-level sensor. The motor-related information obtainer is configured to obtain motor-related information, which relates to a motor, at a timing determined by the command and at a timing based on the wait time period. The initialization command sender is configured to send an initialization command to the connection port. The initialization command includes information to set the wait time period.

According to another aspect of the present disclosure, a method for obtaining motor-related information includes receiving a command from an upper-level controller through an upper-level connection port of a sensor. A wait time period is set based on an order of connection of at least an upper-level sensor or the upper-level controller, the sensor, and a lower-level sensor. Motor-related information, which relates to a motor, is obtained at a timing determined by the command and at a timing based on the wait time period.

According to another aspect of the present disclosure, a sensor includes means for receiving a command from an upper-level controller, and means for obtaining, based on the command, motor-related information at a timing that matches a timing at which another sensor connected to the sensor obtains the motor-related information.

According to the other aspect of the present disclosure, a controller includes the above-described sensor, means for sending the command, and means for making the first timing match the second timing.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4 illustrates a data storage example of wait time period data;

DESCRIPTION OF THE EMBODIMENTS

Figure 1:
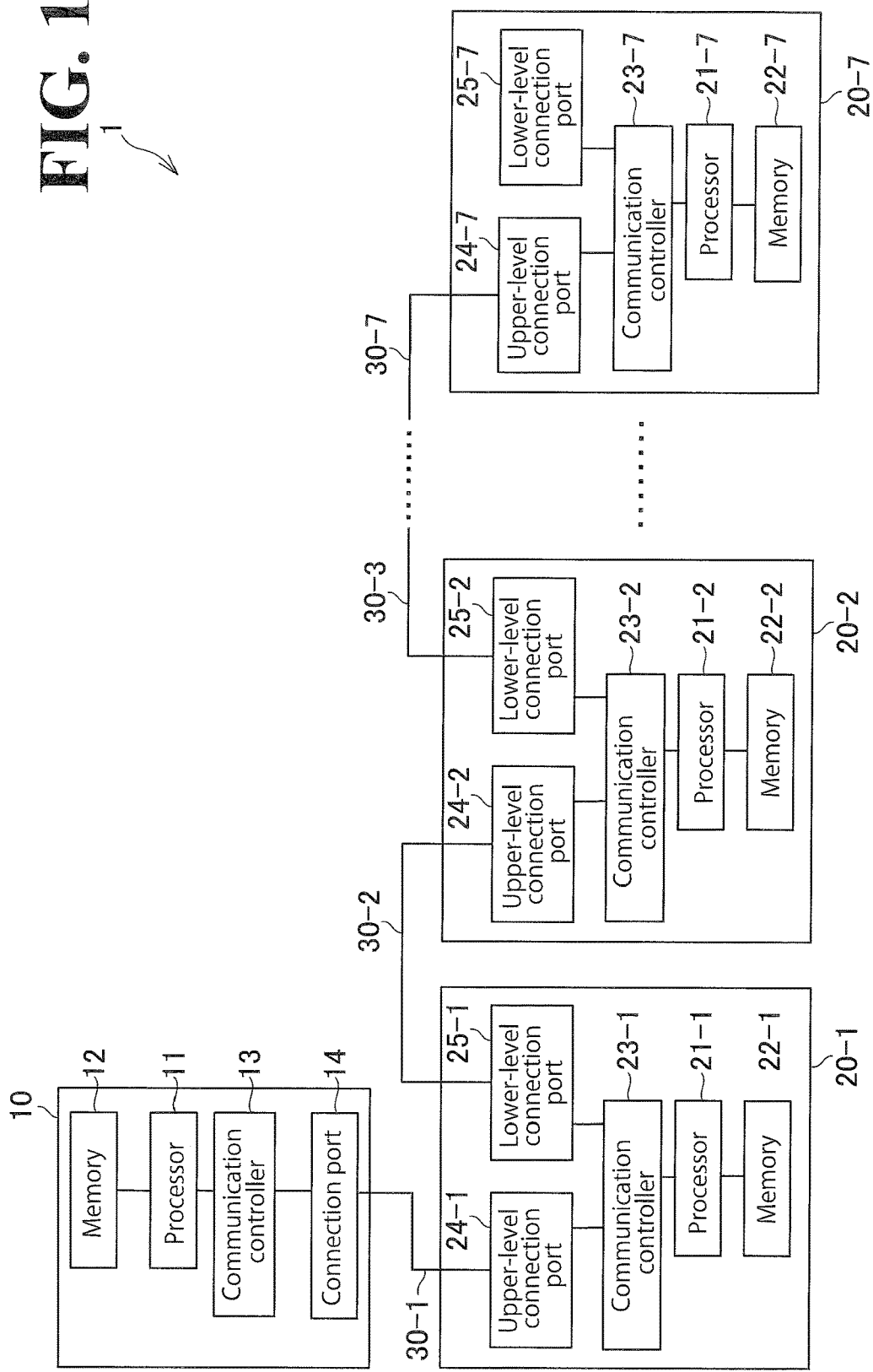
FIG. 1 is a block diagram illustrating a physical configuration of a motor control system according to embodiment 1.

The embodiments will now be described with reference to the accompanying drawings, wherein like reference numerals designate corresponding or identical elements throughout the various drawings.

1. Embodiment 1

According to the inventors' knowledge, when sensors in daisy-chain connection obtain motor-related information, there is a possibility of discrepancies in timings at which the sensors execute commands received from a controller. If there are discrepancies in timings at which the sensors obtain the motor-related information, the controller may perform less accurate motor control. As a result of studies conducted by the inventors in an attempt to improve the accuracy of motor control, the inventors conceived of a novel and unique motor control system and related apparatuses, machines, devices, and methods. In the following description, a motor control system according to embodiment 1 will be detailed. In embodiment 1, encoders will be described as examples of the sensors.

1-1. Physical Configuration of Motor Control System

FIG. 1 is a block diagram illustrating a physical configuration of a motor control system 1 according to embodiment 1. As illustrated in FIG. 1, the motor control system 1 includes a controller 10 (upper-level controller) and a plurality of encoders 20-n (n is an integer of 1 to 7). The plurality of encoders 20-n are connected to each other in a daisy-chain configuration. These elements are connected to each other in a communicable manner through transmission paths 30-n. In embodiment 1, the transmission paths 30-n may be on a half-duplex communication basis or on a full-duplex communication basis.

Daisy-chain connection is a form of connection in which a plurality of devices are wired together in a chain so that data is forwarded in order of connection, from an uppermost-level device to a lowermost-level device. In this embodiment, the controller 10 is connected to the encoders 20-n in sequence. The term upper-level means that a device is upper in the order of connection, and the term lower-level means that a device is lower in the order of connection. The number indicated by "n" of each encoder 20-n represents the level of the encoder 20-n in the order of the daisy-chain connection. In this embodiment, an encoder 20-1 is on the uppermost-level in the order of connection, and an encoder 20-7 is on the lowermost-level in the order of connection. The order of connection can be rephrased as an increasing order of distance from the controller 10, which sends an instruction to the encoders 20-n.

The controller 10 is a computer that controls overall operation of the motor control system 1. For example, the controller 10 sends a command to the encoders 20 at a predetermined timing and receives data from the encoders 20 at a predetermined timing. For further example, the controller 10 sends a command to a motor controller that is provided with an amplifier to output current, voltage, and other parameters to a motor (examples of such motor controller including servo amplifier and servo controller), or the controller 10 receives an error signal and other status signals from the motor controller.

The controller 10 includes a processor 11, a memory 12, a communication controller 13, and a connection port 14. The processor 11 may be a general-purpose integrated circuit made up of CPU and memory, or may be any other integrated circuit such as a micro-controller and an FPGA (Field Programmable Gate Array).

The memory 12 is a general-purpose information storage medium, and includes at least one of a nonvolatile memory and a volatile memory. Examples of the nonvolatile memory include, but are not limited to, ROM (Read Only Memory), EEPROM (Electrically Erasable Programmable Read Only Memory), flash memory, and hard disc. A non-limiting example of the volatile memory is RAM (Random Access Memory). The memory 12 stores programs and various kinds of data.

The communication controller 13 is a general communication-purpose integrated circuit. A non-limiting example of the communication controller 13 is ASIC (Application Specific Integrated Circuit). The connection port 14 is a communication interface through which the controller 10 communicates with external devices. The connection port 14 is used to communicate with the encoders 20-n.

The communication controller 13 communicates with the encoders 20-n through the connection port 14. The communication controller 13 directly communicates with the uppermost-level encoder 20-1, and indirectly communicates with the encoders 20-2 to 20-7, which are on the second or lower levels in the order of connection. The term indirect communication refers to a form of communication that involves interposition of some other device between communicating devices.

Each encoder 20-n is a sensor that detects the position of a motor. The encoder 20-n may be an optical encoder or magnetic encoder, and executes a command received from the controller 10 and sends to the controller 10 a result obtained by executing the command.

The encoder 20-n includes a processor 21-n, a memory 22-n, a the communication controller 23-n, an upper-level connection port 24-n, and a lower-level connection port 25-n. The processor 21-n, the memory 22-n, and the communication controller 23-n may be respectively similar in physical configuration to the processor 11, the memory 12, and the communication controller 13.

Each of the upper-level connection port 24-n and the lower-level connection port 25-n is a communication interface through which the encoder 20-n communicates with external devices. The upper-level connection port 24-n communicates with upper-level devices (upper-level encoders 20-n or the controller 10). The lower-level connection port 25-n communicates with lower-level devices (lower-level encoders 20-n).

As illustrated in FIG. 1, the upper-level connection port, 24-1, of the encoder 20-1, which is on the uppermost level in the order of connection, communicates with the controller 10. The lower-level connection port, 25-2, of the uppermost-level encoder 20-1 communicates with the encoder 20-2, which is one level lower than the uppermost-level encoder 20-1 in the order of connection. Similarly, the upper-level connection ports 24-2 to 24-7 respectively communicate with the encoders 20-1 to 20-6, which are respectively one level upper than the encoders 20-2 to 20-7 in the order of connection. The lower-level connection ports 25-2 to 25-6 respectively communicate with the encoders 20-3 to 20-7, which are respectively one level lower than the encoders 20-2 to 20-6 in the order of connection. Since the encoder 20-7 is on the lowermost level in the order of connection, the lower-level connection port 25-7 does not communicate with any devices.

In the motor control system 1, the encoders 20-1 to 20-7 are connected to each other in a daisy-chain configuration. In the daisy-chain connection, when the encoders 20-1 to 20-6 receive a motor position information obtainment command from the controller 10, each encoder forwards the motor position information obtainment command to the other encoder that is one level lower in the order of connection. In this manner, the motor position information obtainment command is forwarded down to the lowermost-level encoder 20-7.

Figure 2:
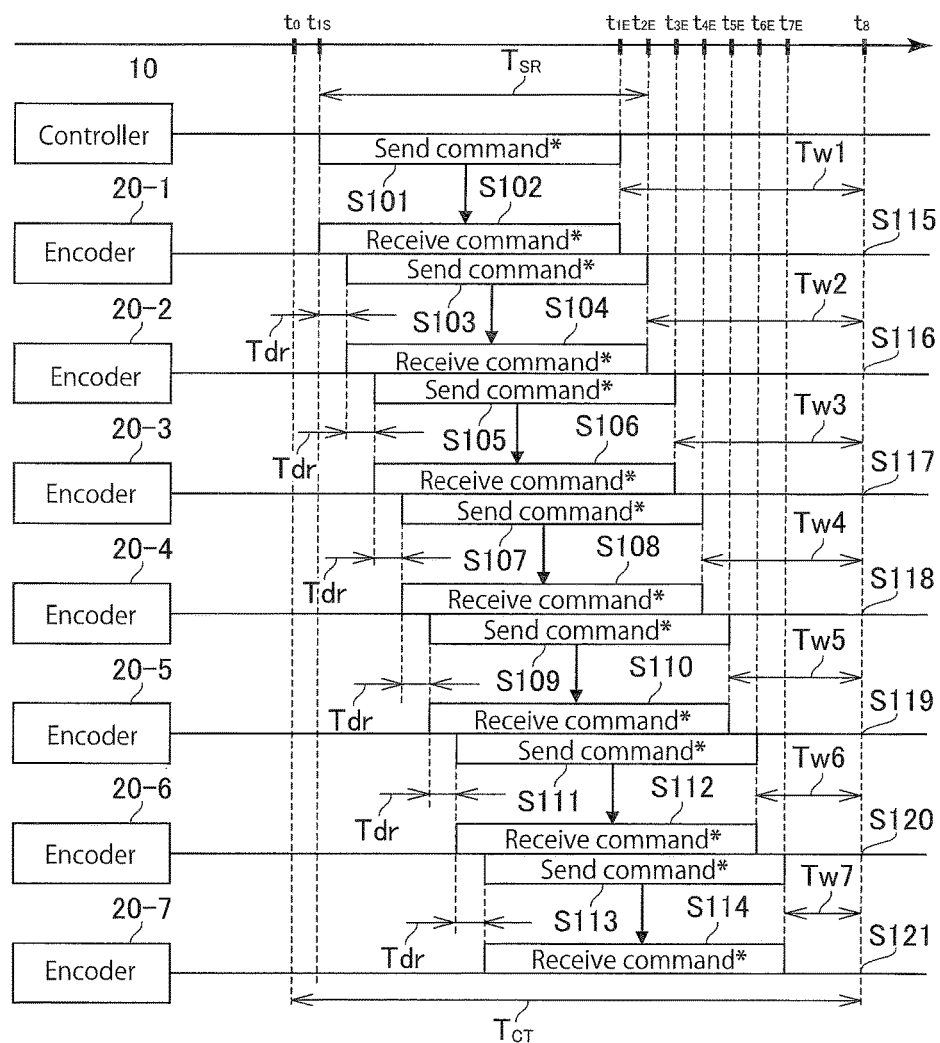
FIG. 2 illustrates how a motor position information obtainment command is forwarded in embodiment 1.

FIG. 2 is a diagram illustrating how the motor position information obtainment command is forwarded. The following description is an outline of how the motor position information obtainment command is forwarded, and a detailed description will be provided later. As illustrated in FIG. 2, t axis represents time axis. First, at t0, which is the start time in a communication cycle, the controller 10 sends the motor position information obtainment command to the encoder 20-1 (S101). The communication cycle has a predetermined period of time.

The encoder 20-1 starts receiving the motor position information obtainment command (S102), and forwards the motor position information obtainment command to the encoder 20-2, which is one level lower than encoder 20-1 in the order of connection (S103). Similarly, the encoders 20-2 to 20-6 start receiving the motor position information obtainment command (S104, S106, S108, S110, S112), and respectively send the motor position information obtainment command to the encoders 20-3 to 20-7, which are respectively one level lower than the encoders 20-2 to 20-6 in the order of connection (S105, S107, S109, S111, S113). Since the encoder 20-7 is on the lowermost level in the order of connection, the encoder 20-7 does not forward the motor position information obtainment command to anywhere, even though the encoder 20-7 receives the motor position information obtainment command (S114).

As illustrated in FIG. 2, a sending delay $T_{dr}$ (repeat delay) occurs between the point of time at which each of the encoders 20-1 to 20-6 starts receiving the motor position information obtainment command and the point of time at which the encoders 20-1 to 20-6 start forwarding the motor position information obtainment command respectively to the encoders 20-2 to 20-7, which are respectively one level lower than the encoders 20-1 to 20-6 in the order of connection. While in embodiment 1 the sending delay $T_{dr}$ is the same throughout the encoders 20-1 to 20-6, the sending delay $T_{dr}$ may vary among the encoders 20-1 to 20-6.

The sending delay $T_{dr}$ causes the encoders 20-1 to 20-7 to finish receiving motor position information obtainment command at different points of time. In this situation, if the encoders 20-1 to 20-7 obtain motor position information immediately after the encoders 20-1 to 20-7 have finished receiving the motor position information obtainment command, discrepancies may occur in timings at which to obtain the motor position information.

In view of this, the motor control system 1 according to embodiment 1 employs the configuration illustrated in FIG. 2. Specifically, the encoders 20-1 to 20-7 are respectively assigned wait time periods $T_{w1}$ to $T_{w7}$, for which the encoders 20-1 to 20-7 wait before the encoders 20-1 to 20-7 execute the motor position information obtainment command. In this manner, the encoders 20-1 to 20-7 make their position obtainment timings match the position obtainment timing t8 (S115 to S121). Functions that implement this configuration will be described in detail below.

1-2. Functions Implemented in Motor Control System

Figure 3:
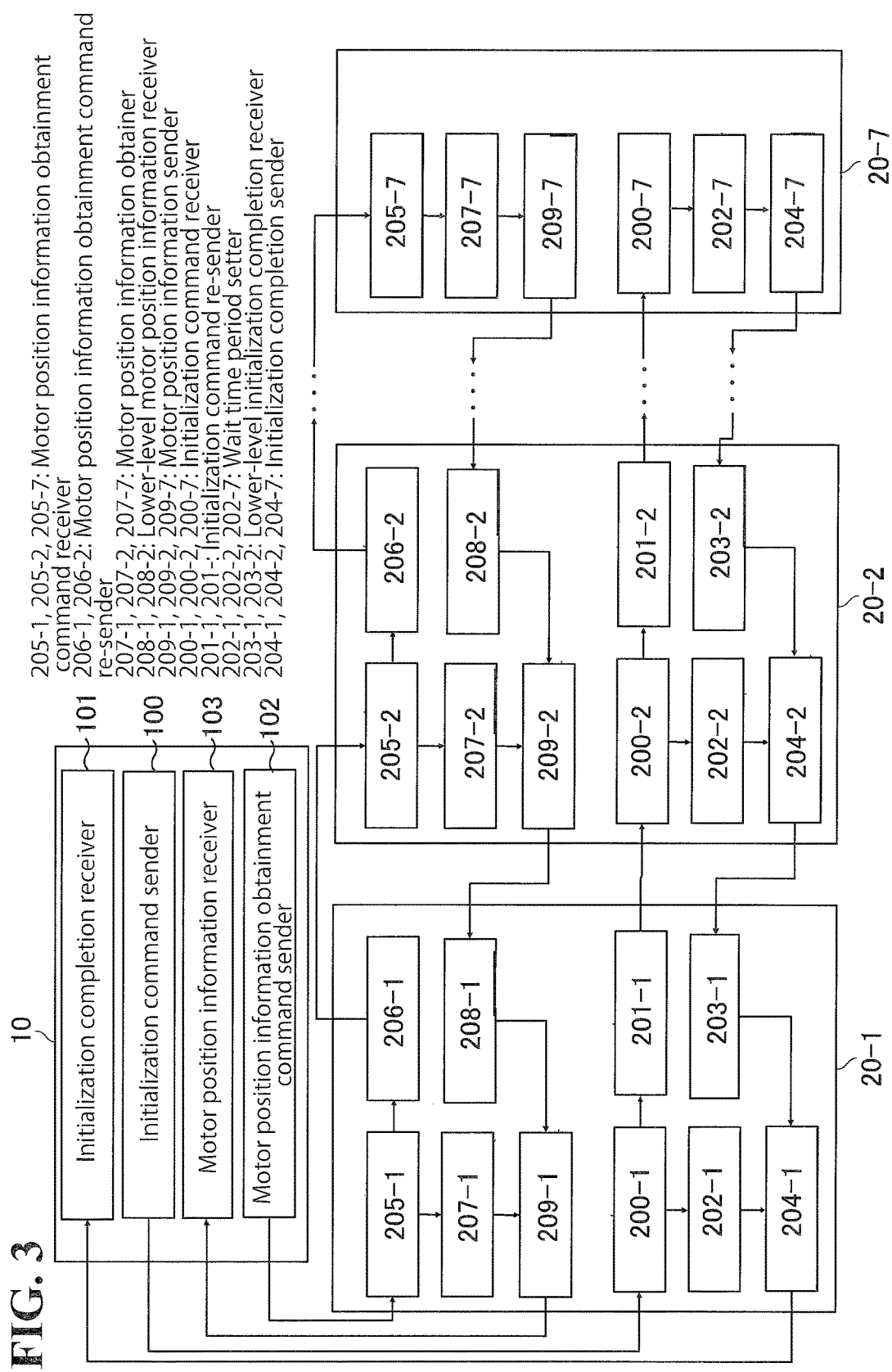
FIG. 3 is a functional block diagram of the motor control system according to embodiment 1.

FIG. 3 is a functional block diagram of the motor control system 1 according to embodiment 1. As illustrated in FIG. 3, the controller 10 includes an initialization command sender 100, an initialization completion receiver 101, a motor position information obtainment command sender 102, and a motor position information receiver 103. These functions are implemented by the processor 11 and the communication controller 13.

Each encoder 20-n includes an initialization command receiver 200-n, an initialization command re-sender 201-n, a wait time period setter 202-n, a lower-level initialization completion receiver 203-n, an initialization completion sender 204-n, a motor position information obtainment command receiver 205-n (a non-limiting example of the command receiver recited in the appended claims), a motor position information obtainment command re-sender 206-n (a non-limiting example of the command re-sender recited in the appended claims), a motor position information obtainer 207-n, a lower-level motor position information receiver 208-n, and a motor position information sender 209-n. These functions are implemented by the processor 21-n and the communication controller 23-n.

The following description will take as an example a wait time period $T_{wn}$ as the wait time period set at the initialization time of the encoder 20-n. In accordance with this example, functions implemented at the time when the encoder 20-n is initialized will be described first. After power source has been input, the controller 10 performs initialization to return the encoders 20-n to initial state setting. In the motor control system 1, the memory 12 of the controller 10 stores wait time period data that indicates the wait time period $T_{wn}$. The motor control system 1 uses the wait time period data to set the wait time period $T_{wn}$ at the initialization time.

FIG. 4 is a diagram illustrating a data storage example of wait time period data. As illustrated in FIG. 4, the wait time period data correlates information (for example, address information) to identify the encoders 20-n with specified wait time periods specified by a user of the motor control system 1. In this embodiment, the specified wait time periods are determined in advance as wait time periods $T_{w1}$ to $T_{w7}$.

The wait time period, $T_{wn}$, of the encoder 20-n is longer as the encoder 20-n is upper in level in the order of the daisy-chain connection, and the wait time period $T_{wn}$ of the encoder 20-n is shorter as the encoder 20-n is lower in level in the order of the daisy-chain connection. In other words, the wait time period $T_{wn}$ of the encoder 20-n is longer as the encoder 20-n receives the motor position information obtainment command at an earlier timing, and the wait time period $T_{wn}$ of the encoder 20-n is shorter as the encoder 20-n receives the motor position information obtainment command at a later timing. In the data storage example illustrated in FIG. 4, the wait time period $T_{w1}$ of the uppermost-level encoder 20-1 is longest, and the wait time period $T_{w7}$ of the lowermost-level encoder 20-7 is shortest.

Figure 5:
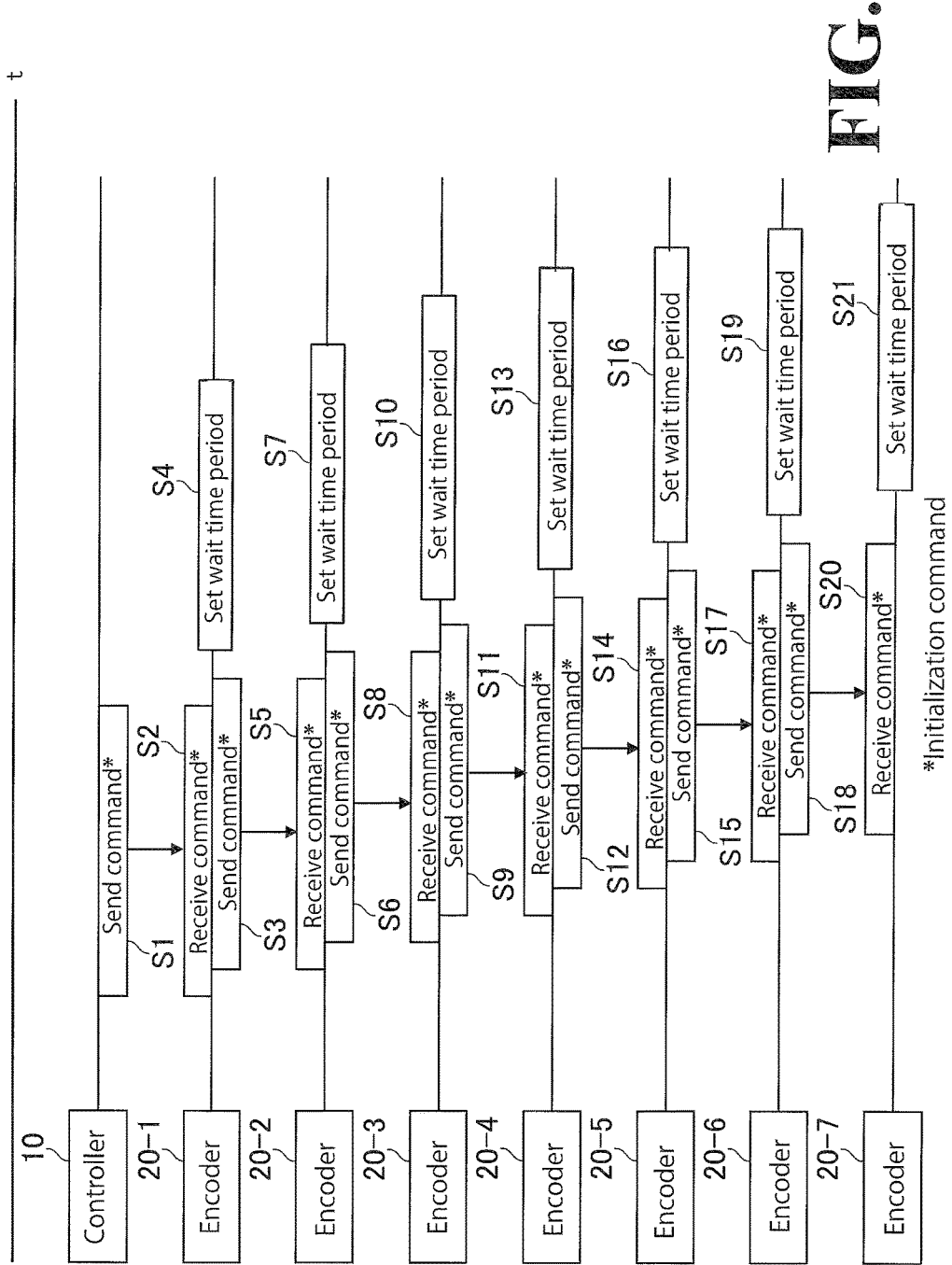
FIG. 5 illustrates flows of processings performed at initialization time.

FIG. 5 illustrates flows of processings performed at initialization time. As illustrated in FIG. 5, first, the initialization command sender 100 of the controller 10 sends an initialization command to the connection port 14 (S1). The initialization command includes information to set the wait time period $T_{wn}$, which is based on the level of the encoder 20-n in the order of the daisy-chain connection. The initialization command is a command to instruct initialization of the encoder 20-n. The form of the initialization command may be any predetermined data form that includes, for example: a command code indicating command type; and wait time period data. The initialization command may also include information to identify the encoder 20-n, to which the command is to be forwarded.

The information to set the wait time period $T_{wn}$ is a wait time period $T_{wn}$ determined for each of the encoders 20-n based on the level of the encoder 20-n's in the order of the daisy-chain connection. In this embodiment, wait time period data corresponds to the information. At S1, the initialization command sender 100 sends to the connection port 14 the initialization command that includes the wait time period data so as to send the initialization command to the encoder 20-1.

The initialization command receiver 200-1 of the encoder 20-1 receives the initialization command from the controller 10 (S2). At S2, the initialization command receiver 200-1 receives the initialization command from the controller 10 through the transmission path 30-1 and the upper-level connection port 24-1.

The initialization command re-sender 201-1 of the encoder 20-1 sends the initialization command to the encoder 20-2, which is lower in level than the encoder 20-1 (S3). The initialization command re-sender 201-1 may send to the encoder 20-2 the initialization command received by the initialization command receiver 200-1 without making any changes to the initialization command, or may make a change (rewriting, addition, or cancellation) to any information included in the initialization command and send the changed initialization command to the encoder 20-2.

After the encoder 20-1 has finished receiving the initialization command, the wait time period setter 202-1 of the encoder 20-1 sets a wait time period $T_{w1}$ based on the order of connection of at least the upper-level encoder (the encoder 20-1 has no encoder upper in level than the encoder 20-1) or the controller 10, the encoder 20-1, and the lower-level encoder 20-$n$ (that is, the order of the daisy-chain connection) (S4). At S4, the wait time period setter 202-1 sets the wait time period $T_{w1}$ based on the initialization command. That is, the wait time period setter 202-1 sets the wait time period $T_{w1}$ based on the specified wait time period included in the initialization command. In this embodiment, as illustrated in FIG. 2, the wait time period setter 202-1 sets the wait time period $T_{w1}$ such that the position obtainment timing t8, at which the motor position information obtainer 207-1 obtains the motor position information, is after the lowermost-level encoder 20-7 has finished receiving the motor position information obtainment command (that is, after time $t_{7E}$ illustrated in FIG. 2).

The processing at S4 will be described in more detail. First, the wait time period setter 202-1 refers to the wait time period data included in the initialization command to obtain the wait time period $T_{w1}$, which is the specified wait time period of the encoder 20-1. This processing is under the assumption that the information to identify the encoder 20-1 is stored in advance in the memory 22-1 and thus the wait time period setter 202-1 is able to identify the specified wait time period of the encoder 20-1 from among the specified wait time periods stored in the wait time period data. Then, the wait time period setter 202-1 holds the wait time period $T_{w1}$ in a memory inside the communication controller 23-1 so as to set the wait time period $T_{w1}$. Another possible embodiment is that the wait time period setter 202-1 holds the wait time period $T_{w1}$ in a memory inside the processor 21-1 or in the memory 22-1.

As illustrated in FIG. 5, the encoders 20-2 to 20-7 each perform processing similar to the processing performed by the encoder 20-1. Specifically, the initialization command receivers 200-2 to 200-7 receive initialization commands respectively sent from the initialization command re-senders 201-1 to 201-6 (S5, S8, S11, S14, S17, S20). The initialization command re-senders 201-2 to 201-6 respectively send the initialization commands to the encoders 20-3 to 20-7, which are respectively lower in level than the encoders 20-2 to 20-6 (S6, S9, S12, S15, S18). Based on the initialization commands, the wait time period setters 202-2 to 202-7 respectively set the wait time periods $T_{w2}$ to $T_{w7}$ (S7, S10, S13, S16, S19, S21).

At the initialization time, each encoder 20-$n$ performs, other than setting the wait time period $T_{wn}$, initialization processing such as parameter initialization based on the initialization command After the encoder 20-$n$ has finished the initialization, the encoder 20-$n$ sends to the controller 10 an initialization finish notification indicating that the initialization has been finished.

While FIG. 5 omits illustration of flows of initialization finish notifications for simplicity of description, the initialization completion senders 204-$n$ of the encoders 20-$n$ send to the controller 10 initialization finish notifications indicating that the encoders 20-$n$ have finished executing the initialization commands. Each initialization finish notification may be made in a predetermined data form. The lower-level initialization completion receivers 203-1 to 203-6 of the encoders 20-1 to 20-6 receive the initialization finish notifications respectively from the encoders 20-2 to 20-7, which are respectively lower in level than the encoders 20-1 to 20-6. Then, the initialization completion sender 204-$n$ forward the initialization finish notifications.

The initialization completion receiver 101 of the controller 10 receives the initialization finish notifications from the encoders 20-$n$. If any initialization is unsuccessful, the controller 10 may send the initialization command again. When the controller 10 receives the initialization finish notifications, thus finishing the initialization processing, the motor control system 1 starts obtaining motor position information to control the motor.

By referring to FIG. 2, description will be made with regard to functions implemented in the obtainment of the motor position information. As illustrated in FIG. 2, the motor position information obtainment command sender 102 of the controller 10 sends a motor position information obtainment command to the connection port 14 (S101). In embodiment 1, the motor position information obtainment command is an example of the command recited in the appended claims and is a command that makes the encoder 20-$n$ obtain the motor position information. The form of the motor position information obtainment command may be any predetermined data form that includes, for example, a command code indicating command type. The motor position information obtainment command may also include information to identify the encoder 20-$n$, to which the command is to be forwarded. At S101, the motor position information obtainment command sender 102 sends the motor position information obtainment command to the connection port 14 so as to send the motor position information obtainment command to the encoder 20-1.

The motor position information obtainment command receiver 205-1 of the encoder 20-1 receives the motor position information obtainment command from the controller 10 (S102). At S102, the motor position information obtainment command receiver 205-1 receives the motor position information obtainment command from the controller 10 through the transmission path 30-1 and the upper-level connection port 24-1.

The motor position information obtainment command re-sender 206-1 of the encoder 20-1 sends to the encoder 20-2 the motor position information obtainment command received by the motor position information obtainment command receiver 205-1 (S103). At S103, the motor position information obtainment command re-sender 206-1 may send to the encoder 20-2 the motor position information obtainment command received by the motor position information obtainment command receiver 205-1 without making any changes to the motor position information obtainment command, or may make a change (rewriting, addition, or cancellation) to any information included in the motor position information obtainment command and send the changed motor position information obtainment command to the encoder 20-2.

The motor position information obtainer 207-1 of the encoder 20-1 obtains motor position information, which relates to the position of a motor, at a timing that is based on a timing determined by the motor position information obtainment command and that is based on the wait time period $T_{w1}$ (S115). The timing determined by the motor position information obtainment command is a timing of receiving the motor position information obtainment command, or a timing determined based on information included in the motor position information obtainment command (see embodiment 5). In this embodiment, the timing determined by the motor position information obtainment command is the timing of receiving the motor position information obtainment command. The timing of receiving the motor position information obtainment command is a point of time in the period between the start of receipt of the motor position information obtainment command and the finish of receipt of the motor position information obtainment command (in the embodiment of FIG. 2, the period between time $t_{1S}$ and time $t_{1E}$). In this embodiment, the timing is time $t_{1E}$, at which the receipt of the motor position information obtainment command finishes.

The timing that is based on the timing of receiving the motor position information obtainment command and that is based on the wait time period $T_{w1}$ is a point of time that is $T_{w1}$ later than the timing of receiving the motor position information obtainment command. As indicated by S115 illustrated in FIG. 2, the motor position information obtainer 207-1 of the encoder 20-1 executes the motor position information obtainment command at time t8, which is $T_{w1}$ later than time $t_{1E}$, at which the receipt of the motor position information obtainment command finishes. As described above, the wait time period $T_{w1}$ is held in the memory of the communication controller 23-1 or in another memory. The motor position information obtainer 207-1 refers to the memory of the communication controller 23-1 or in another memory so as to obtain the wait time period $T_{w1}$ and identify the position obtainment timing t8.

The motor position information includes information that is concerning the position of the motor and that is detectable by the encoder 20-1. Examples of the information included in the motor position information include, but are not limited to, position, rotational frequency, rotational angle, and rotational speed on the full circumference of the encoder 20-1. Other examples of the information included in the motor position information include, but are not limited to, information to identify the encoder 20-1 whose motor position information has been obtained.

As illustrated in FIG. 2, the encoders 20-2 to 20-7 each perform processing similar to the processing performed by the encoder 20-1. Specifically, the motor position information obtainment command receivers 205-2 to 205-7 receive motor position information obtainment commands respectively sent from the motor position information obtainment command re-senders 206-1 to 206-6 (S104, S106, S108, S110, S112, S114). The motor position information obtainment command re-senders 206-2 to 206-6 respectively send the motor position information obtainment commands to the encoders 20-3 to 20-7, which are respectively lower in level than the encoders 20-2 to 20-6 (S105, S107, S109, S111, S113). The wait time period setters 202-2 to 202-7 execute the motor position information obtainment commands at time t8, which is $T_{w2}$ to $T_{w7}$ later than time $t_{2E}$ to time $t_{7E}$, at which the receipt of the motor position information obtainment commands finishes (S116 to S121).

In this manner, during the time period between start time t0 of the communication cycle and the position obtainment timing t8, the motor position information obtainment command is sent from upper-level encoders 20-$n$ to lower-level encoders 20-$n$ in the order of the daisy-chain connection. At S115 to S121, when each encoder 20-$n$ obtains the motor position information, the motor position information is sent from lower-level encoders 20-$n$ to upper-level encoders 20-$n$ in the order of the daisy-chain connection.

While FIG. 2 omits illustration of flows of the motor position information being sent for simplicity of description (see embodiment 2 for details), the motor position information sender 209-7 of the encoder 20-7 sends to the encoder 20-6 the motor position information obtained by the motor position information obtainer 207-7. The lower-level motor position information receiver 208-6 of the encoder 20-6 receives lower-level motor position information from the lower-level connection port 25-6. The lower-level motor position information refers to motor position information received from a lower-level encoder 20-$n$. The motor position information sender 209-6 of the encoder 20-6 sends, through the upper-level connection port 24-6, the motor position information and the lower-level motor position information obtained by the motor position information obtainer 207-6.

The encoders 20-1 to 20-5 each perform processing similar to the processing performed by the encoder 20-6. Specifically, the lower-level motor position information receivers 208-1 to 208-5 receive pieces of lower-level motor position information respectively sent from the motor position information senders 209-2 to 209-6. Then, the motor position information senders 209-1 to 209-5 send, respectively through the upper-level connection ports 24-1 to 24-5, pieces of motor position information and pieces of lower-level motor position information. The motor position information senders 209-1 to 209-7 may send respective pieces of motor position information simultaneously or at timings adjusted to differ from each other.

The motor position information receiver 103 of the controller 10 receives the pieces of motor position information from the encoders 20-$n$. The controller 10 controls the motor based on the received pieces of motor position information. Subsequently, the motor control system 1 repeats a communication cycle of sending and execution of motor position information obtainment commands and sending of motor position information.

1-3. Outline of Embodiment 1

In the motor control system 1 according to embodiment 1, even though the encoders 20-$n$ receive motor position information obtainment commands at different timings, the encoders 20-$n$ execute the motor position information obtainment commands simultaneously at the position obtainment timing t8 so that the position obtainment timings of the encoders 20-$n$ in the daisy-chain connection match. If the position obtainment timings of the encoders 20-$n$ vary, the accuracy of positioning may degrade. In embodiment 1, where the position obtainment timings match, the controller 10 improves the accuracy of positioning. Further, since the encoders 20-$n$ are connected to each other in a daisy-chain configuration, the controller 10 may be connected to the uppermost-level encoder 20-n alone, resulting in a wiring-saved configuration. More specifically, if the controller 10 is directly connected to each of the encoders 20-n, some length of wiring is necessary in each connection, resulting in a wiring-increased configuration, as opposed to the wiring-saved configuration implemented in embodiment 1.

Also in the motor control system 1, since the wait time period $T_{wn}$ is set based on the initialization command, the encoders 20-n store the wait time period $T_{wn}$ after the initialization. This configuration eliminates the need for the wait time period $T_{wn}$ being included in every command, such as the motor position information obtainment command. This, in turn, minimizes the length of the data such as the motor position information obtainment command, resulting in increase in processing speed. In the motor control field, in particular, there is a need for shortening the communication cycle so as to make the communication frequency lower. Thus, there is a need for minimizing the data length per communication cycle. Even in a shortened communication cycle with a lower communication frequency, the motor control system 1 according to this embodiment ensures that the position obtainment timings match.

Also in the motor control system 1, the wait time period $T_{wn}$ is set based on a specified wait time period specified by the user. This configuration enables the user to set a wait time period $T_{wn}$ that is suitable for an individual encoder 20-n.

Also in the motor control system 1, since the encoders 20-n are connected to each other in a daisy-chain configuration, the last encoder 20-n to receive the motor position information obtainment command is the lowermost-level encoder 20-7. Here, after the lowermost-level encoder 20-7 has received the motor position information obtainment command, the encoders 20-n are made to obtain the motor position information simultaneously. This configuration ensures more reliable matching of the timings at which all the encoders 20-n obtain motor positions. That is, before the lowermost-level encoder 20-7 receives the motor position information obtainment command, the upper-level encoders 20-1 to 20-6 are prevented from obtaining the motor position information.

Also in the motor control system 1, an exemplary configuration is to include in the initialization command the wait time period $T_{wn}$ itself, which is based on the level of the encoder 20-n in the order of connection. This configuration eliminates the need for calculating the wait time period $T_{wn}$ on the encoder 20-n side, that is, the received wait time period $T_{wn}$ can be used as it is, resulting in comparatively simpler processing to set the wait time period $T_{wn}$.

1-4. Modification of Embodiment 1

In embodiment 1, the wait time period $T_{wn}$ of the encoder 20-n is set based on the specified wait time period specified by the user. Another possible embodiment is that the wait time period $T_{wn}$ is calculated by the controller 10, instead of being specified by the user. That is, the wait time period $T_{wn}$ of the encoder 20-n may be determined automatically by the controller 10, instead of being determined manually by the user.

Figure 6:
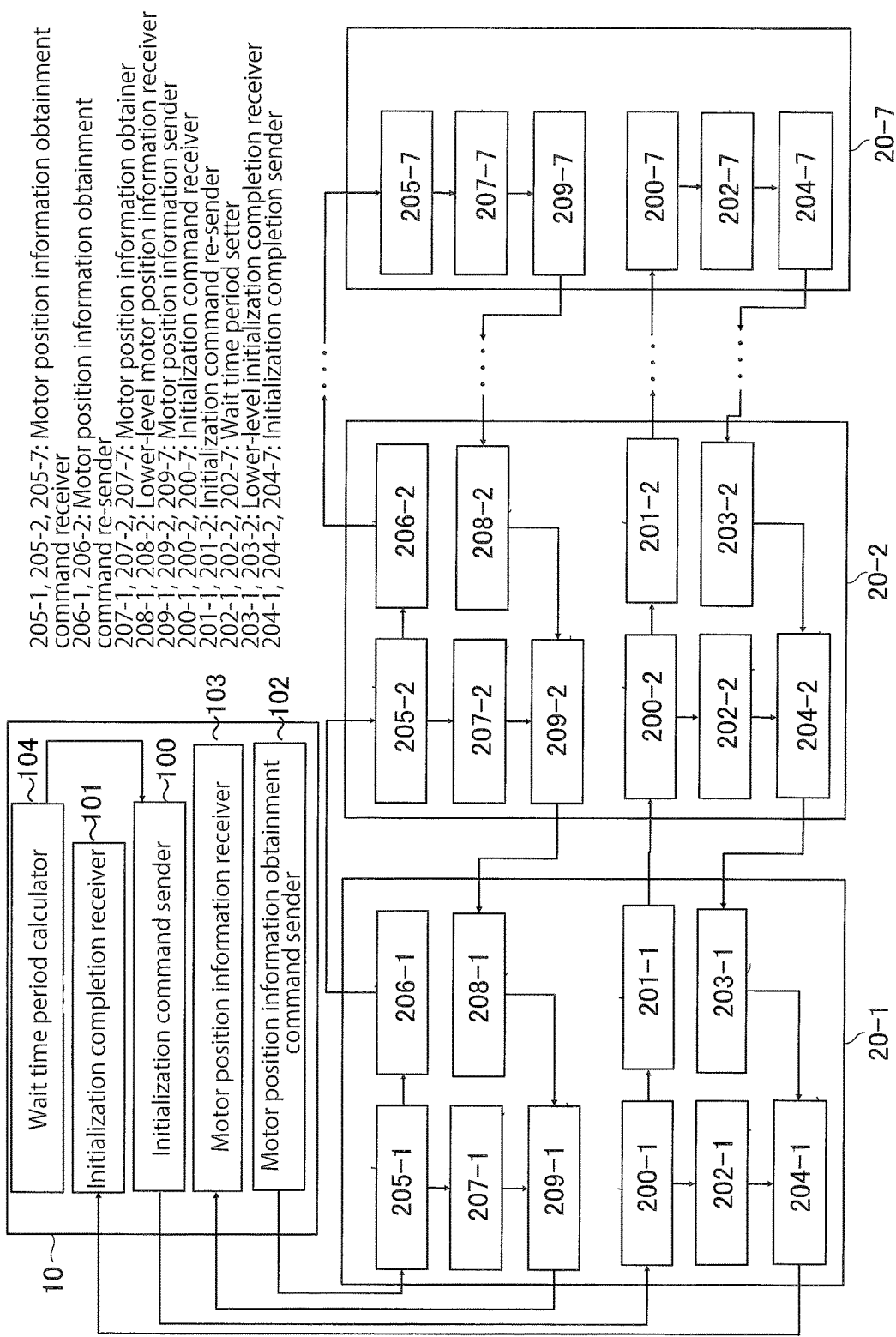
FIG. 6 is a functional block diagram of a modification of embodiment 1.

FIG. 6 is a functional block diagram of a modification of embodiment 1. As illustrated in FIG. 6, in this modification, the controller 10 includes an additional element, namely, a wait time period calculator 104. The wait time period calculator 104 is implemented by the processor 11 and the communication controller 13.

For each encoder 20-n, the wait time period calculator 104 calculates the wait time period $T_{wn}$ based on the level of the encoder 20-n in the order of the daisy-chain connection, the delay $T_{dr}$ in sending the motor position information obtainment command, time period $T_{SR}$ for sending and receiving the motor position information obtainment command (also referred to as sending-receiving time $T_{SR}$), and motor position information obtainment command communication time period $T_{CT}$. The motor position information obtainment command communication time period $T_{CT}$ is determined based on the maximum connection number of the encoders 20-n.

As illustrated in FIG. 2, the time period $T_{SR}$ for sending and receiving the motor position information obtainment command is a time period necessary for the encoder 20-n to send and receive the motor position information obtainment command Specifically, the time period $T_{SR}$ is a time period between the point of time at which the encoder 20-n starts receiving the motor position information obtainment command from the upper-level encoder 20-n (for example, time $t_{1S}$ illustrated in FIG. 2) and the point of time at which the encoder 20-n finishes sending the motor position information obtainment command to the lower-level encoder 20-n (for example, time $t_{2E}$ illustrated in FIG. 2). The maximum connection number of the encoders 20-n refers to the maximum number of the encoders 20-n in the daisy-chain connection, that is, the maximum value of n (seven in this embodiment).

The level of the encoder 20-n in the order of connection, the sending delay $T_{dr}$, and the sending-receiving time $T_{SR}$ may be stored in the memory 12 or may be obtained from the encoder 20-n. When the level of the encoder 20-n in the order of connection is obtained from the encoder 20-n, the level of the encoder 20-n in the order of connection is stored in the memory 22, and the sending delay $T_{dr}$ and the sending-receiving time $T_{SR}$ are calculated by the encoder 20-n. In this case, the communication controller 23-n determines the sending delay $T_{dr}$ as the time period between the point of time at which the encoder 20-n receives data from the controller 10, such as a command, and the point of time at which the encoder 20-n starts forwarding the data to the lower-level encoder 20-n. The communication controller 23-n also determines the sending-receiving time $T_{SR}$ as the time period between the point of time at which the encoder 20-n receives data from the controller 10, such as a command, and the point of time at which the encoder 20-n finishes forwarding the data to the lower-level encoder 20-n. The motor position information obtainment command communication time period $T_{CT}$ may be a set value stored in advance in the memory 12.

A program stored in the memory 12 of the of the controller 10 includes a description of calculation formulae by which the wait time period $T_{wn}$ is calculated based on the level of each encoder 20-n in the order of the daisy-chain connection, the sending delay $T_{dr}$, the sending-receiving time $T_{SR}$, and the motor position information obtainment command communication time period $T_{CT}$. The wait time period calculator 104 substitutes these parameters into the calculation formulae to calculate the wait time period $T_{wn}$ for each encoder 20-n.

For example, the wait time period calculator 104 calculates the wait time period $T_{w7}$ to satisfy the following calculation formula 1. The wait time period $T_{w7}$ is calculated as represented by calculation formula 1 so as to prevent the position obtainment timing t8 from being after the motor position information obtainment command communication time period $T_{CT}$ has elapsed. The wait time period calculator 104 also calculates the wait time periods $T_{w1}$ to $T_{w6}$ to respectively satisfy the following calculation formulae 2 to 7. Then, the wait time period calculator 104 generates wait time period data indicating the calculated wait time periods $T_{w1}$ to $T_{w7}$.

$0 \leq T_{w7} \leq T_{CT} - T_{SR} - 5*T_{dr}$      Calculation formula 1:

$T_{w6} = T_{w7} + T_{dr}$      Calculation formula 2:

$T_{w5} = T_{w7} + 2*T_{dr}$      Calculation formula 3:

$T_{w4} = T_{w7} + 3*T_{dr}$      Calculation formula 4:

$T_{w3} = T_{w7} + 4*T_{dr}$      Calculation formula 5:

$T_{w2} = T_{w7} + 5*T_{dr}$      Calculation formula 6:

$T_{w1} = T_{w7} + 6*T_{dr}$      Calculation formula 7:

In sending the initialization command, the initialization command sender 100 puts, in the initialization command, information indicating the wait time period $T_{wn}$ calculated by the wait time period calculator 104. For example, in the initialization command, pieces pf information to identify the encoders 20-$n$ are respectively correlated with the wait time periods $T_{wn}$ calculated by the wait time period calculator 104. In other words, the initialization command sender 100 sends an initialization command that includes the wait time period data generated by the wait time period calculator 104. The method by which each encoder 20-$n$ sets the wait time period $T_{wn}$ based on the initialization command is similar to the method described above in embodiment 1.

In this modification, the wait time period $T_{wn}$ is calculated based on the level of each encoder 20-$n$ in the order of connection and based on the sending delay $T_{dr}$. This configuration ensures more reliable matching of the position obtainment timings of all the encoders 20-$n$. For example, this configuration eliminates or minimizes such a situation that an accumulation of sending delays $T_{dr}$ in upper-level encoders 20-$n$ causes the upper-level encoders 20-$n$ to obtain motor positions before a lower-level encoder 20-$n$ receives the motor position information obtainment command.

Also in this modification, the wait time period $T_{wn}$ is calculated based on the time period $T_{SR}$ for sending and receiving the motor position information obtainment command and based on the motor position information obtainment command communication time period $T_{CT}$. This configuration keeps the position obtainment timing within the motor position information obtainment command communication time period $T_{CT}$. Specifically, one communication cycle is made up of the motor position information obtainment command communication time period $T_{CT}$, for which the motor position information obtainment command is sent and received, and a motor position communication time period, for which the motor position information is then sent. In this respect, this modification prevents the position obtainment timing from falling within the motor position communication time period. In other words, this modification eliminates or minimizes such a situation that the motor position information has not been obtained yet when the time to send the motor position information comes.

The method by which the wait time period calculator 104 calculates the wait time period $T_{wn}$ will not be limited to the above-described method. The wait time period calculator 104 may calculate the wait time period $T_{wn}$ based on at least one of the information stored in the memory 12 and information that the controller 10 receives from the encoder 20-$n$.

A possible example is that the controller 10 stores the time when the controller 10 sent the command, that the controller 10 receives from the lowermost-level encoder 20-7 information indicating the point of time at which the lowermost-level encoder 20-7 finished receiving the command, and that the wait time period calculator 104 calculates the wait time period $T_{wn}$ based on a difference between the sending time and the finish time. In this case, the controller 10 and the encoders 20-$n$ preferably keep the same time. Another possible example is to multiply a number indicating the level of the encoder 20-$n$ in the order of connection by a predetermined constant so as to calculate the wait time period $T_{wn}$.

2. Embodiment 2

Next, embodiment 2 will be described. According to the inventors' knowledge of the conventional art, when sensors in daisy-chain connection send motor-related information to the controller, it is necessary to adjust the timings at which the sensors send the motor-related information so as to prevent the timings from overlapping each other. As a result of studies conducted by the inventors in an attempt to facilitate the sending of the motor-related information, the inventors conceived of a novel and unique motor control system and related apparatuses, machines, devices, and methods. In the following description, a motor control system according to embodiment 2 will be detailed. In embodiment 2 as well, encoders will be described as examples of the sensors.

The motor control system 1 according to embodiment 2 has a physical configuration and a functional block diagram that are respectively similar to the physical configuration and the functional block diagram employed in embodiment 1. The following description of embodiment 2 details processings performed by each encoder 20-$n$, namely, the processing of forwarding the motor position information obtainment command and the processing of sending the motor position information to the controller 10.

2-1. Functions Implemented in Embodiment 2

Figure 7:
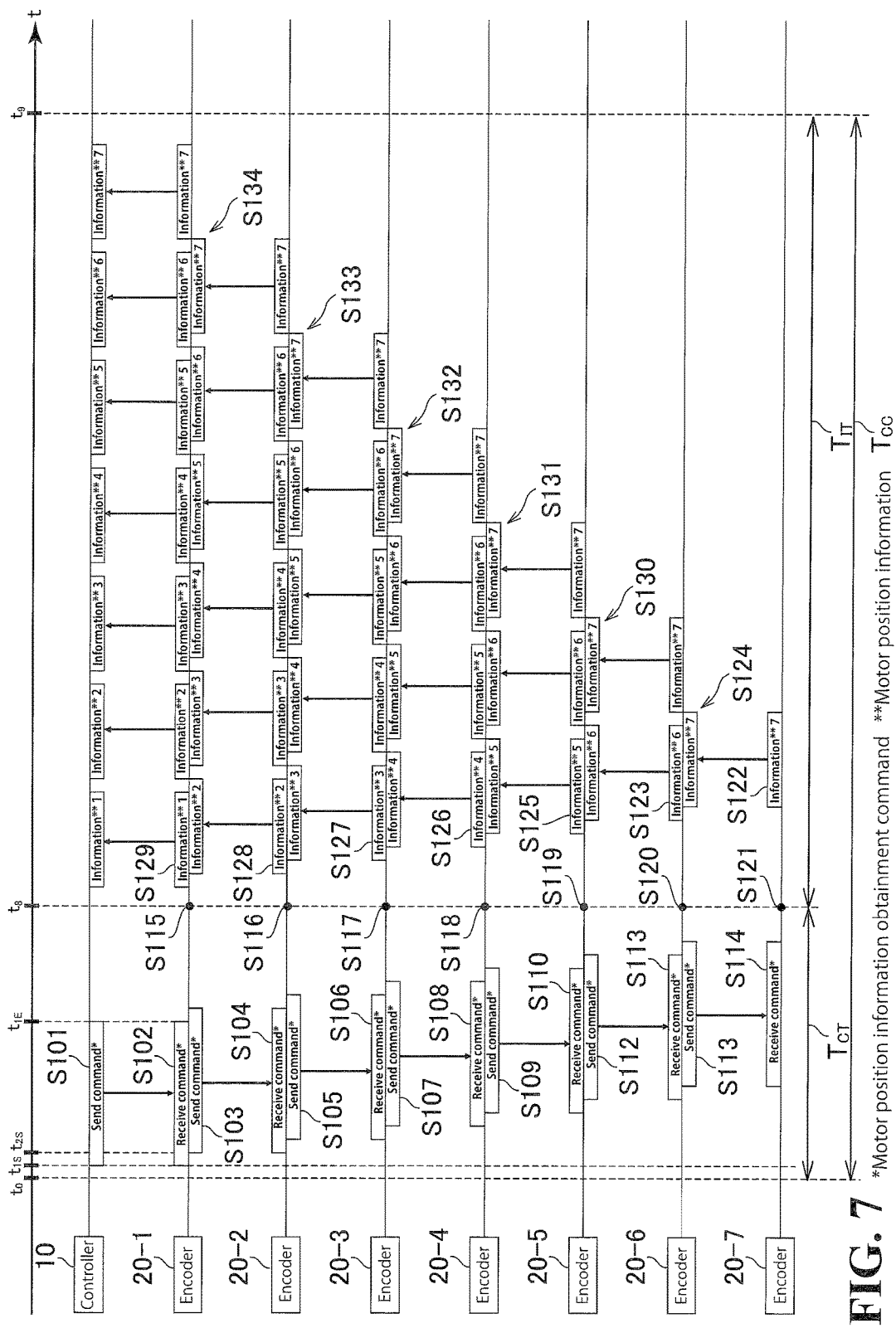
FIG. 7 illustrates how motor position information is sent to a controller in embodiment 2.

FIG. 7 illustrates how the motor position information is sent to the controller 10 in embodiment 2. As seen from FIG. 7, the flows indicated by S101 to S121, which are before the encoders 20-$n$ obtain the motor position information, are similar to the flows indicated by S101 to S121 in embodiment 1. The following description details the processing that the encoders 20-$n$ perform between S102 and S113; specifically, the encoders 20-$n$ send the motor position information obtainment command.

As illustrated in FIG. 7, motor position information communication time period $T_{IT}$ is a time period for which the motor position information and the lower-level motor position information are sent and received. The motor position information communication time period $T_{IT}$ is longer than the motor position information obtainment command communication time period $T_{CT}$, for which the motor position information obtainment command is sent and received. For example, the motor position information obtainment command communication time period $T_{CT}$ is a time period between the start time t0 and the position obtainment timing t8 of communication cycle $T_{CC}$. The motor position information communication time period $T_{IT}$ is a time period between the position obtainment timing t8 and end time t9 of the communication cycle $T_{CC}$ (start time of the next communication cycle $T_{CC}$).

As described above, one motor position information obtainment command communication time period $T_{CT}$ and one motor position information communication time period $T_{IT}$ are included in one communication cycle $T_{CC}$. After the motor position information obtainment command communication time period $T_{CT}$, the motor position information communication time period $T_{IT}$ comes. In other words, during the motor position information obtainment command communication time period $T_{CT}$, data is sent from upper-level encoders 20-$n$ to lower-level encoders 20-$n$ in the order of the daisy-chain connection. Then, the motor position information communication time period $T_{IT}$ comes, during which data is sent from lower-level encoders 20-$n$ to upper-level encoders 20-$n$ in the order of the daisy-chain connection.

As illustrated in FIG. 7, the motor position information obtainment command receiver 205-1 receives the motor position information obtainment command Before the motor position information obtainment command receiver 205-1 finishes receiving the motor position information obtainment command, the motor position information obtainment command re-sender 206-1 of the encoder 20-1 sends the motor position information obtainment command through the lower-level connection port 25-1. That is, time $t_{2S}$, at which the motor position information obtainment command re-sender 206-1 starts sending the motor position information obtainment command to the encoder 20-2, is before time $t_{1E}$, at which the motor position information obtainment command receiver 205-1 finishes receiving the motor position information obtainment command. The motor position information obtainment command re-sender 206-1 does not wait for the finish of receipt of the motor position information obtainment command from the controller 10. That is, before the finish of receipt of the motor position information obtainment command, the motor position information obtainment command re-sender 206-1 starts sending the motor position information obtainment command to the encoder 20-2.

For example, the motor position information obtainment command re-sender 206-1 sends, through the lower-level connection port 25-1 and by cut-through method, the motor position information obtainment command received by the motor position information obtainment command receiver 205-1. The cut-through method is a communication method used when a forwarding device is connected to a destination device to which the forwarding device intends to forward received information. By the cut-through method, the forwarding device receives the information and at the same time forwards the information without accumulating the information in the forwarding device.

For example, the motor position information obtainment command re-sender 206-1 refers to information indicating a destination device included in a predetermined portion (for example, header) of the motor position information obtainment command. When the destination device is the lower-level encoder 20-2, the motor position information obtainment command re-sender 206-1 receives the motor position information obtainment command and at the same time forwards to the encoder 20-2 the motor position information obtainment command without accumulating the motor position information obtainment command. The above and following descriptions are under the assumption that each encoder 20-$n$ stores, in a memory such as the memory 22-$n$, information to identify encoders 20-$n$ that are lower and upper in level than the encoder 20-$n$.

The encoders 20-2 to 20-6 each perform processing similar to the processing performed by the encoder 20-1.

Specifically, the motor position information obtainment command re-senders 206-2 to 206-6 send, by the cut-through method, motor position information obtainment commands respectively to the encoders 20-3 to 20-7, which are respectively lower in level than the encoders 20-2 to 20-6 (S105, S107, S109, S111, S113). After the encoder 20-7 has finished receiving the motor position information obtainment command, each encoder 20-$n$ obtains the motor position information at the position obtainment timing t8, similarly to embodiment 1.

The cut-through method should not be construed as limiting the method of forwarding the motor position information obtainment command Any other method is possible insofar as the sending of the motor position information obtainment command starts before the finish of receipt of the motor position information obtainment command. A possible method is to accumulate the received motor position information obtainment command and send the motor position information obtainment command before the finish of receipt of the motor position information obtainment command.

After the position obtainment timing t8, the encoders 20-$n$ sequentially start sending the motor position information to the controller 10. The timings at which the encoders 20-$n$ send the motor position information may be timings that are predetermined periods of time later than the timings at which the encoders 20-$n$ receive the motor position information obtainment command. Alternatively, the timings at which the encoders 20-$n$ send the motor position information may be the same. For example, the motor position information sender 209-7 of the encoder 20-7 sends the motor position information to the encoder 20-6 (S122). The lower-level motor position information receiver 208-6 of the of the encoder 20-6 receives the lower-level motor position information from the lower-level connection port 25-6 (S124). Here, as indicated by S123 illustrated in FIG. 7, the motor position information sender 209-6 is still sending the motor position information at this point of time and thus unable to send the lower-level motor position information immediately.

In view of this situation, the motor position information sender 209-6 sends the motor position information through the upper-level connection port 24-6 (S123), and sends, through the upper-level connection port 24-6, the lower-level motor position information after the motor position information sender 209-6 has finished sending the motor position information (S124). For example, the point of time at which the encoder 20-6 starts sending the lower-level motor position information to the encoder 20-5 is after the point of time at which the encoder 20-6 finishes sending the motor position information. In FIG. 7, the point of time at which the encoder 20-6 starts sending the lower-level motor position information to the encoder 20-5 is the same as the point of time at which the receipt of the lower-level motor position information finishes. At S124, the motor position information sender 209-6 stores the lower-level motor position information in the memory inside the communication controller 23-6 until the motor position information sender 209-6 finishes sending the motor position information. The lower-level motor position information may be stored in the memory inside the processor 21-6 or may be stored in the memory 22-6.

At S124, the motor position information sender 209-6 sends the lower-level motor position information to the upper-level connection port 24-6 by, for example, store-and-forward method. The store-and-forward method is a method that accumulates all the information received and then forwards the information to the destination device. In this embodiment, as illustrated in FIG. 7, after the motor position information sender 209-6 has finished receiving the lower-level motor position information, the motor position information sender 209-6 starts sending the lower-level motor position information. In other words, even if the motor position information sender 209-6 receives the lower-level motor position information during the time when the motor position information sender 209-6 is sending the motor position information, the motor position information sender 209-6 waits, without sending the lower-level motor position information.

The encoders 20-1 to 20-5 each perform processing similar to the processing performed by the encoder 20-6. Specifically, the motor position information senders 209-1 to 209-5 send the motor position information (S125 to S129) and at the same time send the lower-level motor position information by the store-and-forward method (S130 to S134). The processing performed after the controller 10 has received the motor position information from the encoders 20-$n$ is similar to the processing in embodiment 1.

The store-and-forward method should not be construed as limiting the method of sending the lower-level motor position information. Any other method is possible insofar as the sending of the lower-level motor position information starts after the finish of sending of the motor position information. A possible method is to accumulate the received lower-level motor position information and start forwarding the lower-level motor position information when the sending of the motor position information finishes before the finish of receipt of the lower-level motor position information. That is, it is possible to start forwarding the lower-level motor position information without waiting for the receipt of the lower-level motor position information to finish.

2-2. Outline of Embodiment 2

In the motor control system 1 according to embodiment 2, since the encoders 20-$n$ are connected to each other in a daisy-chain configuration, it is necessary for each encoder 20-$n$ to send the lower-level motor position information to the upper-level encoder 20-$n$. For example, although it is possible to use the cut-through method to forward the lower-level motor position information to the controller 10, it is also necessary to adjust the sending timings of the encoders 20-$n$ so as to prevent the sending timings from overlapping each other. In view of this situation, in embodiment 2, the lower-level motor position is sent in a store-and-forward form, for example; thus it is not necessary to make the above adjustment. This configuration saves the user the labor of adjustment and saves the controller 10 and the encoder 20-$n$ the labor of processing. Further, the controller 10 is able to reliably and quickly obtain the motor position information.

Also in the motor control system 1 according to embodiment 2, once each encoder 20-$n$ receives the motor position information obtainment command from the upper-level encoder 20-$n$, each encoder 20-$n$ basically receives no data from the upper-level encoder 20-$n$ until the communication cycle $T_{CC}$ comes. Embodiment 2 utilizes this point by using the cut-through method to send the motor position information obtainment commands received from upper-level encoders 20-$n$. This configuration eliminates the need for accumulating the motor position information obtainment commands, and ensures quicker forwarding of the motor position information obtainment commands to lower-level encoders 20-$n$. As a result, the motor position information obtainment command communication time period $T_{CT}$ is shortened, and the motor position information communication time period $T_{IT}$ is made sufficiently long. Further, the motor position obtainment timing is advanced in time, enabling the controller 10 to obtain the motor position at an earlier stage of time.

Also in the motor control system 1 according to embodiment 2, since the controller 10 needs to receive the motor position information from the encoders 20-$n$, the motor position information communication time period $T_{IT}$ is set longer than the motor position information obtainment command communication time period $T_{CT}$. This configuration ensures reliable sending of the motor position even though the store-and-forward method is used. That is, this configuration eliminates or minimizes such a situation that the next communication cycle $T_{CC}$ comes when the sending of the motor position has not finished yet.

It should be noted with respect to the store-and-forward method that if the lower-level motor position information is sent without any changes made to the lower-level motor position information, a signal pattern at the head of the data may go missing through forwarding due to such causes as a delay in sending. In view of this possible situation, it is possible to add a data detection-use predetermined data pattern to the head of the data and send the resulting data, in an attempt to prevent the head data from going missing at the forwarding time.

2-3. Modification of Embodiment 2

In embodiment 2, each encoder 20-$n$ sends the motor position information and the lower-level motor position information separately. Another possible embodiment is that each motor encoder 20-$n$ combines the motor position information and the lower-level motor position information into one piece of data and sends the combined data.

Figure 8:
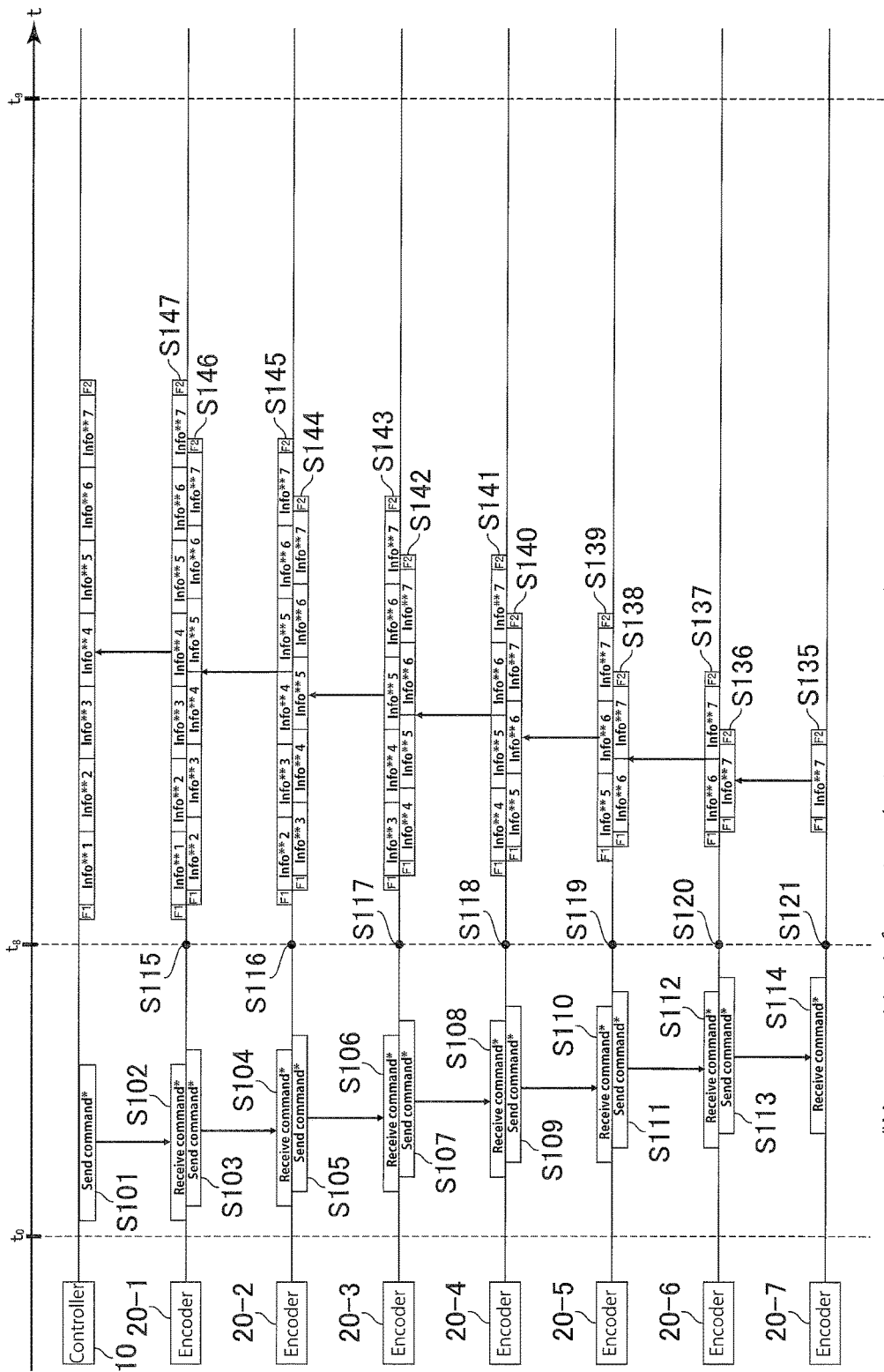
FIG. 8 illustrates how the motor position information is sent to the controller in a modification of embodiment 2.

FIG. 8 illustrates how the motor position information is sent to the controller 10 in a modification of embodiment 2. As indicated by S101 to S121 illustrated in FIG. 8, the flows between the position obtainment timing t8 and the time when the encoder 20-7 sends the motor position information to the encoder 20-6 are similar to the flows indicated by S101 to S121 illustrated in FIG. 7.

The motor position information and the lower-level motor position information each has a preamble header in a predetermined form, which is not described in embodiments 1 and 2. The preamble header may be a piece of data with a predetermined value and used to, for example, indicate the start position of data. As illustrated in FIG. 8, the motor position information sender 209-7 of the encoder 20-7 sends data to the encoder 20-6 (S135). The data is made up of a preamble header F1, motor position information, and an end flag F2. The preamble header F1, the motor position information, and the end flag F2 are arranged in this order. The end flag F2 may be a piece of data with a predetermined value and used to, for example, indicate the end position of the data.

When the lower-level motor position information receiver 208-6 of the of the encoder 20-6 receives the lower-level motor position information (S136), the motor position information sender 209-6 removes the preamble header F1 of the lower-level motor position information, and sends the lower-level motor position information following the motor position information (S137). At S137, exemplary processing performed by the motor position information sender 209-6 is to combine first data with second data. The first data is made up of a preamble header F1 and motor position information that are arranged in this order. The second data is the lower-level motor position information with its preamble header F1 removed. The motor position information sender 209-6 sends the resulting combined data, which is made up of the preamble header F1, the motor position information, the lower-level motor position information, and the end flag F2 that are arranged in this order.

The encoders 20-1 to 20-5 each perform processing similar to the processing performed by the encoder 20-6. Specifically, when the lower-level motor position information receivers 208-1 to 208-5 receive the lower-level motor position information (S138, S140, S142, S144, S146), the motor position information senders 209-1 to 209-5 remove the preamble header F1 of the lower-level motor position information and send the lower-level motor position information following the motor position information (S137, S139, S141, S143, S145). The processing performed after the controller 10 has received the motor position information from the encoders 20-n is similar to the processing in embodiment 1.

In this modification, each encoder 20-n removes the preamble header F1 of the lower-level motor position information and sends the lower-level motor position information following the encoder 20-n's own motor position information. This configuration shortens the length of the data that is to be sent, resulting in improved data forwarding efficiency.

In embodiment 2 and its modification, each encoder 20-n may be assigned a wait time period $T_{wn}$, as in embodiment 1, or may be assigned no wait time period $T_{wn}$. That is, in embodiment 2 and its modification, there may be discrepancies in the position obtainment timings of the encoders 20-n insofar as the above-described methods of forwarding the motor position information obtainment command and sending the motor position information and the lower-level motor position information are observed.

3. Embodiment 3

Next, embodiment 3 will be described. According to the inventors' knowledge of the conventional art, when a sensor uses a half-duplex communication path to send motor-related information to the controller, such a situation may occur that cross-talk noise or other kinds of noise from signals traveling through other cables may join the communication path. As a result of studies conducted by the inventors in an attempt to reduce the influence of cross-talk noise and other kinds of noise, the inventors conceived of a novel and unique motor control system and related apparatuses, machines, devices, and methods. In the following description, a motor control system according to embodiment 3 will be detailed. In embodiment 3 as well, encoders will be described as examples of the sensors.

The motor control system 1 according to embodiment 3 has a similar physical configuration to the physical configuration described in embodiment 1. It is noted, however, that the transmission paths 30-n according to embodiment 3 are half-duplex communication paths. The half-duplex communication system may be implemented according to the RS-485 standard, for example. In this case, the connection port 14, the upper-level connection port 24-n, and the lower-level connection port 25-n each have an RS-485 transceiver. The upper-level connection port 24-n is connected to an upper-level encoder 20-n or the controller 10 in a half-duplex manner. The lower-level connection port 25-n is connected to a lower-level encoder 20-n in a half-duplex manner.

3-1. Functions Implemented in Embodiment 3

Figure 9:
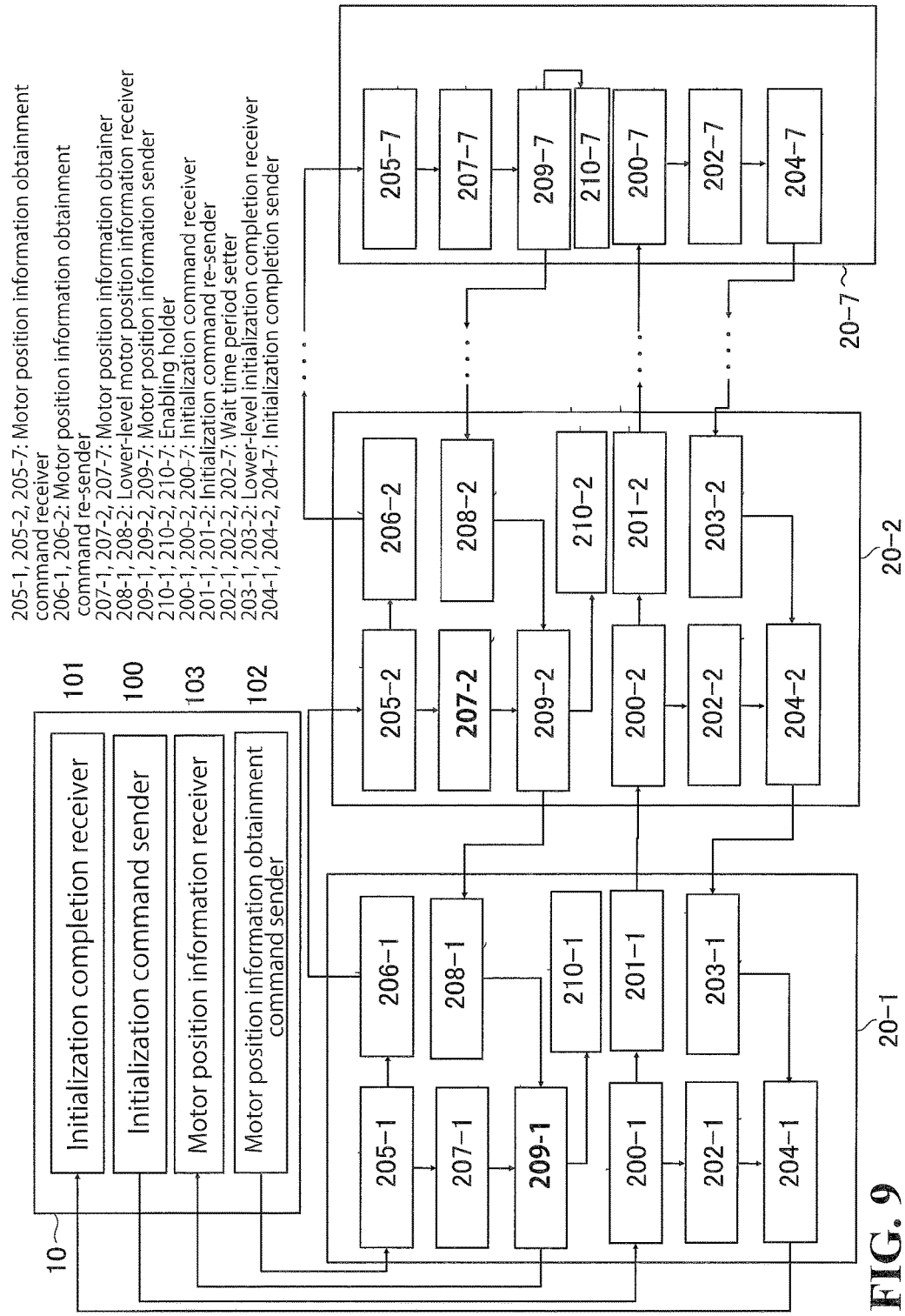
FIG. 9 is a functional block diagram of a motor control system according to embodiment 3.

FIG. 9 is a functional block diagram of the motor control system according to embodiment 3. As illustrated in FIG. 9, the encoders according to embodiment 3 each implement an enabling holder 210-n. Embodiment 3 may be similar in other functions to embodiments 1 and 2. The enabling holder 210-n is implemented by a communication controller 23.

In embodiment 3, once each encoder 20-n receives the motor position information obtainment command from the upper-level encoder 20-n, each encoder 20-n basically receives no data from the upper-level encoder 20-n until the next communication cycle $T_{CC}$ comes. Embodiment 3 utilizes this point by turning the upper-level connection port 24-n into sending enabling state so as to stabilize the signals through the transmission paths 30-n and thus eliminate or minimize the influence of cross-talk.

Figure 10:
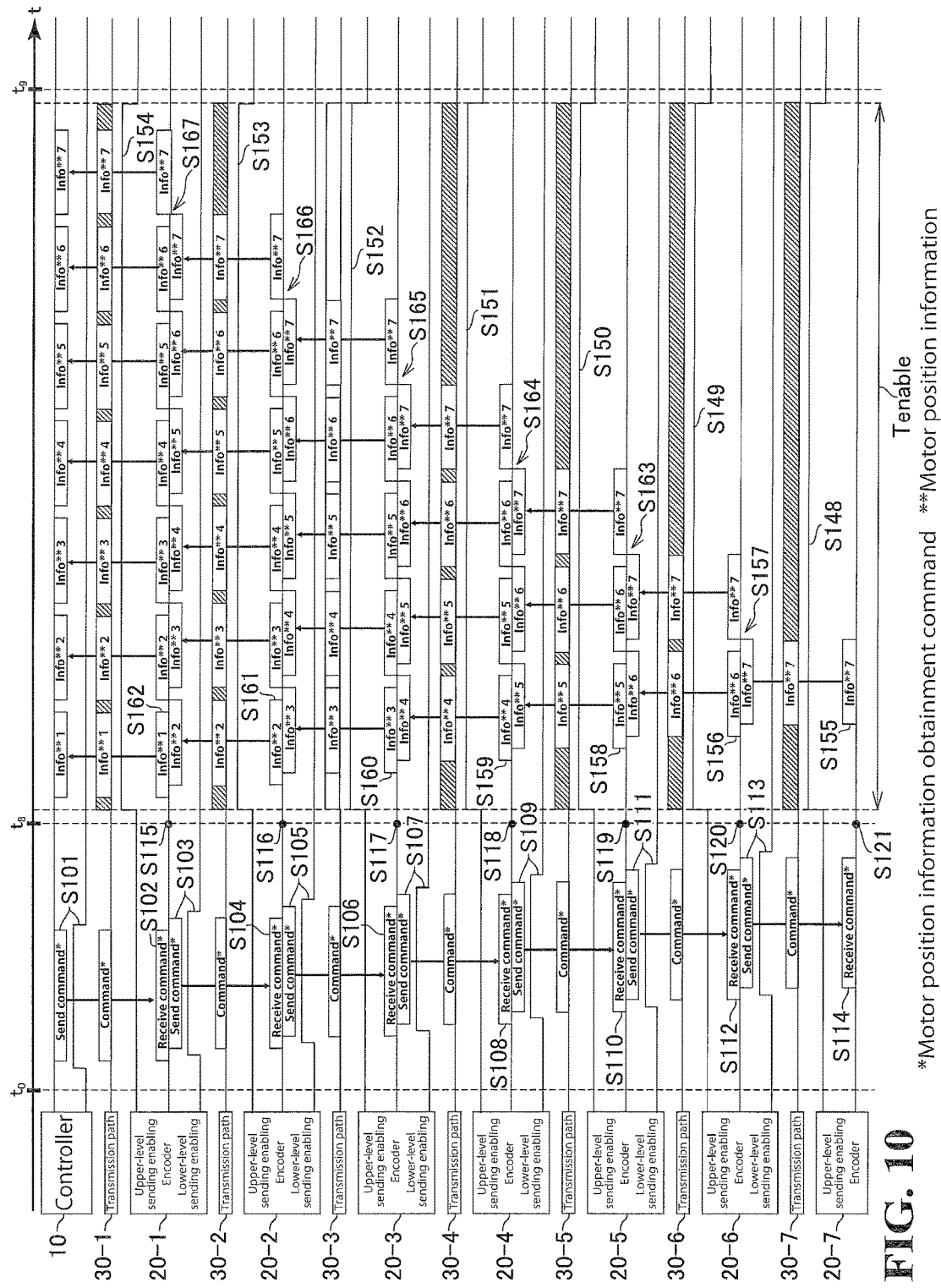
FIG. 10 illustrates flows of processings performed according to embodiment 3.

FIG. 10 illustrates flows of processings performed according to embodiment 3. As seen from FIG. 10, the flows indicated by S101 to S121, which are before the encoders 20-n obtain the motor position information, are similar to the flows indicated by S101 to S121 in embodiments 1 and 2. The following description details the processing that the encoders 20-n perform between S102 and S113; specifically, the encoders 20-n send the motor position information obtainment command.

As illustrated in FIG. 10, at S101, the motor position information obtainment command sender 102 of the controller 10 turns the connection port 14 into sending enabling state, sends the motor position information obtainment command, and releases the sending enabling state after the motor position information obtainment command sender 102 has finished sending the motor position information obtainment command. In FIG. 10, the sending enabling state is indicated by the rising parts of the lines indicated by "sending enabling". The sending enabling state is implemented by sending enabling signals each with a predetermined number of bits. Similarly, sending enabling signals each with a predetermined number of bits may be used to release the sending enabling state.

When at S102 the motor position information obtainment command receiver 205-1 of the encoder 20-1 receives the motor position information obtainment command, then at S103 the motor position information obtainment command re-sender 206-1 turns the lower-level connection port 25-1 into sending enabling state, sends the motor position information obtainment command, and releases the sending enabling state after the motor position information obtainment command re-sender 206-1 has finished sending the motor position information obtainment command.

The encoders 20-2 to 20-6 each perform processing similar to the processing performed by the encoder 20-1. Specifically, the motor position information obtainment command re-senders 206-2 to 206-6 respectively turn the lower-level connection ports 25-2 to 25-6 into sending enabling state, send the motor position information obtainment command, and release the sending enabling state after the motor position information obtainment command re-senders 206-2 to 206-6 have finished sending the motor position information obtainment command (S105, S107, S109, S111, S113). After the encoder 20-7 has finished receiving the motor position information obtainment command, the encoders 20-*n* obtain the motor position information at the position obtainment timing t8, similarly to embodiment 1.

In embodiment 3, after the position obtainment timing t8, the enabling holders 210-1 to 210-7 respectively turn the upper-level connection ports 24-1 to 24-7 into sending enabling state (S148 to S154). With the upper-level connection ports 24-1 to 24-7 in sending enabling state, the motor position information senders 209-*n* turn into a state of being able to send the motor position information. Thus, at S155 to S167, the motor position information senders 209-*n* send the motor position information. The manner of sending at S155 to S167 is respectively similar to the manner of sending at S122 to S134. Another possible embodiment is that the manner of sending at S155 to S167 is respectively similar to the manner of sending at S135 to S147.

As illustrated in FIG. 10, after the motor position information senders 209-1 to 210-7 have finished sending the motor position information, the enabling holders 210-1 to 210-7 keep the respective upper-level connection ports 24-*n* in sending enabling state for a predetermined period of time. To keep the upper-level connection ports 24-*n* in sending enabling state is to apply, through communication cables, the above-described sending enabling signals each with a row of a predetermined number of bits so as to keep the potential on the communication paths at predetermined values (that is, to keep fixed signal levels). Thus, the potential on the communication paths is prevented from going unstable, making cross-talk noise and other kinds of noise less influential. The above-described predetermined period of time may be any period of time determined in advance. A non-limiting example of the predetermined period of time is between the point of time when the motor position information senders 209-1 to 210-7 finish sending the motor position information and the point of time when the next communication cycle $T_{CC}$ comes. In this embodiment, the enabling holders 210-1 to 210-7 keep the sending enabling state for a state keeping time period $T_{enable}$, which is a given period of time.

The state keeping time period $T_{enable}$ is determined by the communication cycle $T_{CC}$, and may be the same throughout the encoders 20-*n* or may be determined on an individual encoder 20-*n* basis. In the sending enabling state, the transmission paths 30-*n* have fixed signal levels. Thus, the transmission paths 30-1 to 30-7 have their signal levels fixed for the periods indicated by slanted lines in FIG. 10. The state keeping time period $T_{enable}$ may be stored in advance in a memory such as the memory 22 or may be set at the initialization time, similarly to the wait time period $T_{wn}$.

The enabling holder 210-*n* releases the sending enabling state at least until the motor position information obtainment command receiver 205-*n* receives the motor position information obtainment command. For example, the enabling holder 210-*n* releases the sending enabling state before the end time t9 of the communication cycle $T_{CC}$ (that is, the start time of the next communication cycle $T_{CC}$).

3-2. Outline of Embodiment 3

In the motor control system 1 according to embodiment 3, once each encoder 20-*n* receives the motor position information obtainment command from the upper-level encoder 20-*n*, each encoder 20-*n* basically receives no information from the upper-level encoder 20-*n* until the communication cycle $T_{CC}$ comes. In view of this, after the encoder 20-*n* has sent the motor position information, the encoder 20-*n* turns the transmission path 30-*n* into sending enabling state to fix the signal level of the transmission path 30-*n*. This configuration eliminates or minimizes noise influence when noise from signals traveling through other cables join the transmission path 30-*n* due to cross-talk. For example, as the encoder 20-*n* is lower in level in the order of connection, there is a longer period of time without data sending. Therefore, the encoder 20-*n* is more susceptible to noise as the encoder 20-*n* is closer to the lowermost-level encoder 20-*n*. Even in the encoder 20-*n* closer to the lowermost-level encoder 20-*n*, the influence of noise is eliminated or minimized.

If the encoder 20-*n* is kept in the sending enabling state in the next communication cycle $T_{CC}$, the encoder 20-*n* is unable to receive the next motor position obtainment command. In view of this situation, the sending enabling state is released until the next communication cycle $T_{CC}$ comes. This configuration ensures reliable receipt of the next motor position obtainment command while eliminating or minimizing the influence of noise.

In embodiment 3, each encoder 20-*n* may be assigned a wait time period $T_{wn}$, as in embodiment 1, or may be assigned no wait time period $T_{wn}$. Also in embodiment 3, the various data may be sent in the method employed in embodiment 2 or may be sent in some other method. That is, in embodiment 3, there may be discrepancies in the position obtainment timings of the encoders 20-*n*, and it is not necessary to use the cut-through method or the store-and-forward method insofar as the above-described methods of keeping and releasing the sending enabling state of the upper-level connection port 24-*n* are observed.

It is possible to combine any two or all of embodiments 1 to 3 together.

4. Embodiment 4

Next, embodiment 4 will be described. In embodiments 1 to 3, each encoder 20 obtains the motor position information in response to the motor position information obtainment command Another possible embodiment is that each encoder 20 does not receive the motor position information obtainment command but obtains the motor position information at the same position obtainment timings of the other encoders 20. In embodiments 1 to 3, the motor position information obtainment command is a non-limiting example of the command recited in the appended claims. In embodiment 4, an initialization command is a non-limiting example of the command recited in the appended claims.

The motor control system 1 according to embodiment 4 has a physical configuration similar to the physical configurations employed in embodiments 1 to 3. The functional block illustrating the motor control system 1 according to embodiment 4 is approximately similar to the functional blocks employed in embodiments 1 to 3. Still, the controller 10 according to embodiment 4 sends no motor position information obtainment command, and therefore, the motor position information obtainment command sender 102 of the controller 10 may be omitted. Similarly, each encoder 20 receives no motor position information obtainment command, and therefore, the motor position information obtainment command receiver 205-*n* and the motor position information obtainment command re-sender 206-*n* may be omitted. In embodiment 4, the initialization command receiver 200-*n* is a non-limiting example of the command receiver recited in the appended claims, and the initialization command re-sender 201-*n* is a non-limiting example of the command re-sender recited in the appended claims.

Figure 11:
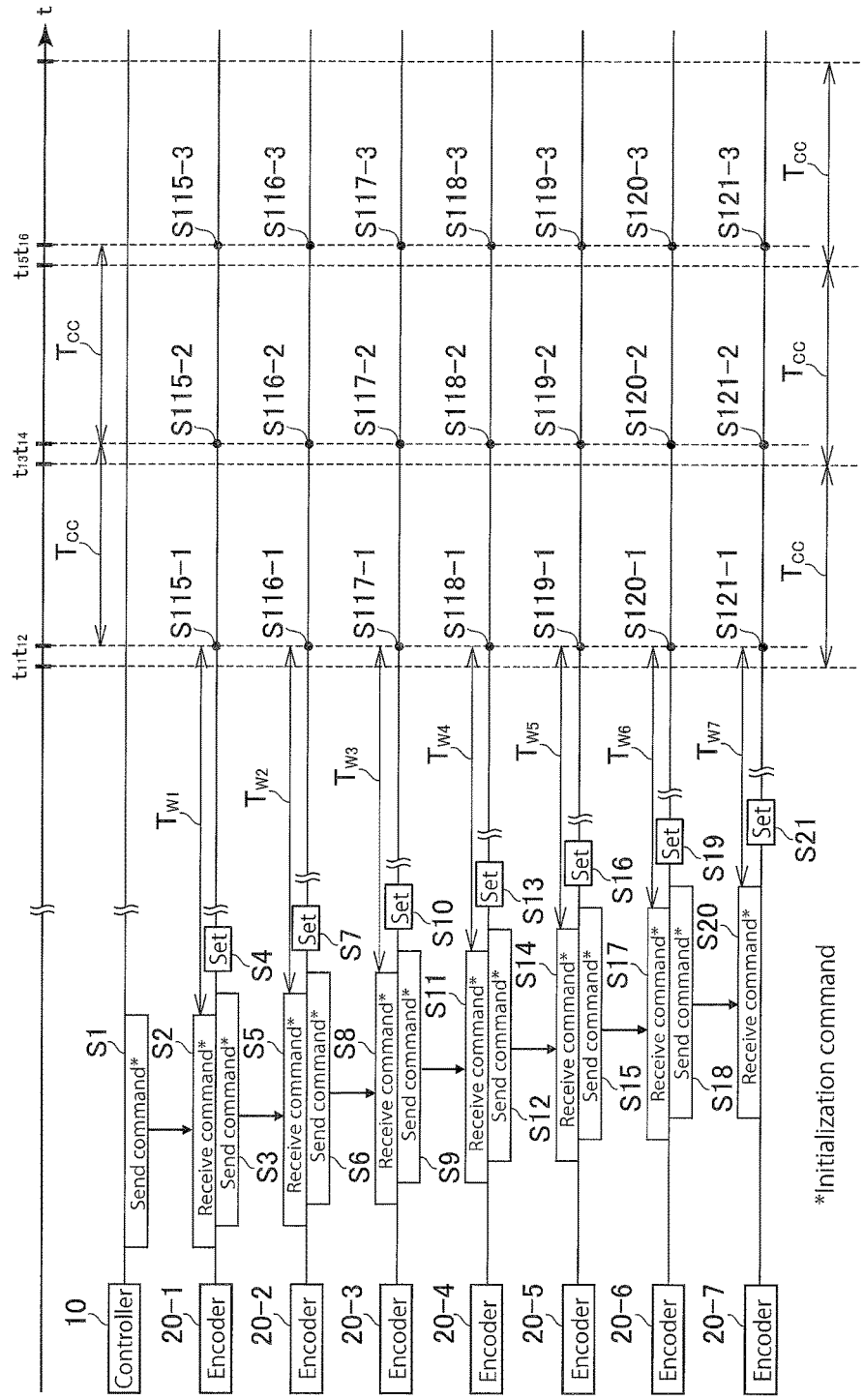
FIG. 11 illustrates flows of processings performed according to embodiment 4.

FIG. 11 illustrates flows of processings performed according to embodiment 4. In FIG. 11, the processings of sending the motor position information to the controller 10 performed by the encoders 20 are omitted for simplicity of description. As illustrated in FIG. 11, first, the processings at S1 to S21 are performed, similarly to embodiments 1 to 3. Embodiment 4 is under the assumption that communication cycle information is included in the initialization command. The communication cycle information indicates the time length of the communication cycle $T_{CC}$, and may be stored in a memory such as the memory 12 of the of the controller 10. At S4, S7, S10, S13, S16, S19, and S21, the wait time period setters 202-1 to 202-7 respectively set the wait time periods $T_{w1}$ to $T_{w7}$, which are between the timing of receiving the initialization command and the first position obtainment timing $t_{12}$.

The receipt timing of the initialization command is a point of time somewhere in the period between the start and finish of receipt of the initialization command. In this embodiment, the timing of receiving the initialization command is the time of finish of receipt of the initialization command. The first position obtainment timing refers to the first position obtainment timing after the receipt of the initialization command. Thus, the time lengths of the wait time periods $T_{w1}$ to $T_{w7}$ in embodiment 4 are respectively different from the time lengths of the wait time periods $T_{w1}$ to $T_{w7}$ in embodiments 1 to 3. For example, the wait time periods $T_{w1}$ to $T_{w7}$ each have a time length that is between the time of finish of receipt of the initialization command and the position obtainment timing $t_{12}$, which is a predetermined period of time after the start time $t_{11}$ of the communication cycle $T_{CC}$. The communication cycle $T_{CC}$ may be next to the communication cycle $T_{CC}$ in which the initialization command was received or may be predetermined cycles after the communication cycle $T_{CC}$ in which the initialization command was received. The above-described predetermined period of time may be determined to ensure a sufficient amount of the motor position information communication time period $T_{IT}$, and may be zero. The delay in sending the initialization command may be the same as the delay $T_{dr}$ in sending the motor position information obtainment command, described in embodiment 1. In this case, in embodiment 4 as well, there are discrepancies in the wait time periods $T_{w1}$ to $T_{w7}$, with each of the discrepancies corresponding to the sending delay $T_{dr}$.

At S4, S7, S10, S13, S16, S19, and S21, the wait time period setters 202-1 to 202-7 hold, in memories such as the memories of the communication controllers 23-1 to 23-7, the communication cycle information included in the initialization commands. These processings are for the purpose of specifying the second and later position obtainment timings.

The motor position information obtainers 207-1 to 207-7 obtain the first motor position information at the position obtainment timing $t_{12}$, which is wait time periods $T_{w1}$ to $T_{w7}$ after the timing of receiving the initialization commands (S115-1 to S121-1). For example, at the timing of receiving the initialization commands, the motor position information obtainers 207-1 to 207-7 start time keeping, and at the elapse of the wait time periods $T_{w1}$ to $T_{w7}$ held in memories such as the memories of the communication controllers 23-1 to 23-7 elapse, the motor position information obtainers 207-1 to 207-7 obtain the motor position information.

The processings at S115-1 to S121-1 are respectively similar to the processings at S115 to S121 described in embodiments 1 to 3. In this embodiment, the processings of sending the motor position information to the controller 10 performed by the encoders 20 are omitted, as described above. By a method such as the method described in embodiment 2, the motor position information may be sent to the controller 10 until the start time $t_{13}$ of the next communication cycle $T_{CC}$ comes.

After the first position obtainment timing $t_{12}$, the motor position information obtainers 207-1 to 207-7 obtain motor position information in every communication cycle $T_{CC}$ (S115-2 to S121-2, S115-3 to S121-3). For example, at the point of time when the motor position information obtainers 207-1 to 207-7 obtain the motor position information, the motor position information obtainers 207-1 to 207-7 start time keeping, and at the elapse of the communication cycle $T_{CC}$ held in memories such as the memories of the communication controllers 23-1 to 23-7, the motor position information obtainers 207-1 to 207-7 obtain the motor position information. The first position obtainment timing $t_{12}$ is the same throughout the encoders 20, and after the first position obtainment timing $t_{12}$, position obtainment timings $t_{14}$ and $t_{16}$ come at predetermined time intervals. This configuration eliminates the need for sending and receiving motor position information obtainment commands while ensuring that the second and later position obtainment timings $t_{14}$ of the encoders 20 match and the second and later position obtainment timings $t_{16}$ of the encoders 20 match.

Embodiment 4 eliminates the need for sending and receiving motor position information obtainment commands while ensuring that the timings at which the encoders 20-$n$ obtain the motor position information match. The elimination of the need for sending and receiving motor position information obtainment commands ensures a sufficient amount of the motor position information communication time period $T_{IT}$ even if the communication cycle $T_{CC}$ is shortened.

In embodiment 4, after the first position obtainment timing $t_{12}$, the motor position information is obtained in every communication cycle $T_{CC}$. "In every communication cycle $T_{CC}$" should not be construed in a limiting sense; any other configuration is possible insofar as the timings at which the encoders 20-$n$ obtain the motor position information match. That is, the period of time between a position obtainment timing and the next position obtainment timing is the same throughout the encoders 20-$n$, so that the timings at which the encoders 20-$n$ obtain the motor position information match. The period of time may be set in the encoders 20-$n$ based on an instruction from the controller 10.

It is possible to combine any or all of embodiments 1 to 3 with embodiment 4. For example, similarly to embodiment 1, the wait time period setter 202-$n$ may set the wait time period $T_{wn}$ such that the position obtainment timing is after the lowermost-level encoder 20-7 has finished receiving the initialization command. For further example, similarly to the modification of embodiment 1, the controller 10 may include the wait time period calculator 104. In this case, the wait time period calculator 104 may calculate the wait time period $T_{wn}$ based on the level of the encoder 20-$n$ in the order of connection, the delay in sending the initialization command, the time period for sending and receiving the initialization command, and the communication time period for which the initialization command is sent and received. The initialization command re-sender 201-$n$ is a non-limiting example of the command re-sender recited in the appended claims, and may send the initialization command to the lower-level encoder 20-$n$ by the cut-through method, similarly to embodiment 2.

5. Embodiment 5

Next, embodiment 5 will be described. In embodiments 1 to 4, each encoder 20 obtains the motor position information based on the motor position information obtainment command and the timing of receiving the initialization command. In embodiment 5, each encoder 20 obtains the motor position information based on a timing specified by the controller 10. The following description concerns an exemplary case where the timing that serves as the starting point of waiting for the obtainment of the motor position information is a timing specified by the controller 10, instead of the timing of receiving the initialization command or the timing of receiving the motor position information obtainment command.

The motor control system 1 according to embodiment 5 has a similar physical configuration to the physical configurations described in embodiments 1 to 4. The functional block illustrating the motor control system 1 according to embodiment 5 may be approximately similar to the functional blocks employed in embodiments 1 to 3. Alternatively, similarly to embodiment 4, the motor position information obtainment command sender 102, the motor position information obtainment command receiver 205-n, and the motor position information obtainment command re-sender 206-n may be omitted.

The processing flows before execution of the initialization commands may be similar to the processing flows indicated by S1 to S21 in embodiment 1 (FIG. 5). In embodiment 5, when the encoders 20-n receive the respective initialization commands, the encoders 20-n initialize time information at, for example, S4, S7, S10, S13, S16, S19, and S21. For simplicity of description, the following description concerns a case where the time information is initialized at steps S4, S7, S10, S13, S16, S19, and S21, at which the wait time periods $T_{wn}$ are set. Another possible embodiment is that the step of initializing the time information is a separate step from the step of setting the wait time period $T_{wn}$.

The time information is a value indicating time. Examples of the time information include, but are not limited to: a count-up timer or a count-down timer that gains or loses time on a predetermined-period-of-time basis; and a real-time clock time that tells date and time. In this embodiment, a count-up timer is used. The time information is stored in the memory of the communication controller 23-1 or in another memory. The initialization of the time information is to turn the value of the time information into a predetermined value; for example, to make the time that the count-up timer tells zero. Upon initialization of the time information, each encoder 20-n starts time keeping and updates the time information on a predetermined-period-of-time basis. In this embodiment, each encoder 20-n makes the time information zero, that is, makes the time that the count-up timer tells zero, and at this point of time, each encoder 20-n starts counting up the count-up timer.

As illustrated in FIG. 5, since the encoders 20-n are connected to each other in a daisy-chain configuration, there are discrepancies in the timings at which the encoders 20-n receive the initialization commands and initialize the time information, with each of the discrepancies corresponding to the sending delay $T_{dr}$. That is, the time information of each encoder 20-n at a point of time has a different value corresponding to the level of the encoder 20-n in the order of the daisy-chain connection. More specifically, assume that the value of the time information of each encoder 20-n is $T_n$. The encoder 20-1 initializes the time information at a timing earlier than the timings at which the other encoders 20-2 to 20-7 initialize the respective time information. At S4, the time information $T_1$ of the encoder 20-1 becomes zero. Then, the encoder 20-1 starts counting up the time information $T_1$, and at the point of time when the encoder 20-1 counts up the time information $T_1$ by a value indicating the sending delay $T_{dr}$, the encoder 20-2 makes the time information $T_2$ zero. Thus, there are discrepancies in the pieces of time information $T_n$ of the encoders 20-n, with each of the discrepancies corresponding to the sending delay $T_{dr}$.

Figure 12:
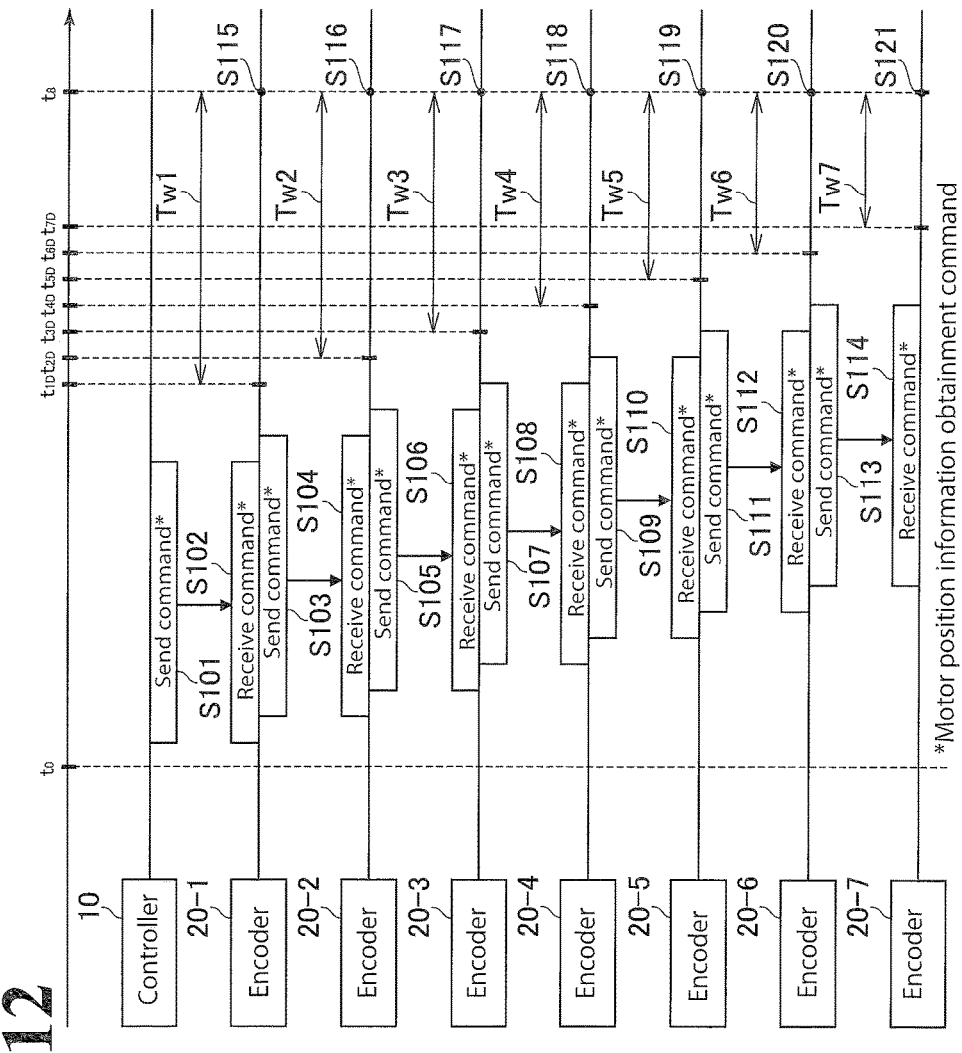
FIG. 12 illustrates how the motor position information obtainment command is forwarded in embodiment 5.

By executing the initialization command in this manner, each encoder 20-n obtains the motor position information. FIG. 12 illustrates how the motor position information obtainment command is forwarded in embodiment 5. As illustrated in FIG. 12, the processings at S101 to S114 are performed, that is, the encoders 20-n send and receive the respective motor position information obtainment commands, similarly to embodiment 1 (FIG. 2). Embodiment 5 is under the assumption that starting point information is included in each motor position information obtainment command. The starting point information indicates a timing that serves as the starting point of the wait time period $T_{wn}$ (in this embodiment, the value that the count-up timer tells). The motor position information obtainer 207-n refers to the timing included in the received motor position information obtainment command, and obtains the motor position information at a waiting timing corresponding to the wait time period $T_{wn}$ of waiting after the referred timing.

As described above, there are discrepancies in the pieces of time information $T_n$ of the encoders 20-n, with each of the discrepancies corresponding to the sending delay $T_{dr}$. Accordingly, as illustrated in FIG. 12, there are discrepancies in timings $t_{1D}$ to $t_{6D}$, which are respectively specified by the encoders 20-1 to 20-6 based on the pieces of starting point information, with each of the discrepancies corresponding to the sending delay $T_{dr}$. Similarly, there are discrepancies in timings $t_{2D}$ to $t_{7D}$, which are respectively specified by the encoders 20-2 to 20-7 based on the pieces of starting point information, with each of the discrepancies corresponding to the sending delay $T_{dr}$. Here, there are discrepancies in the wait time periods $T_{wn}$, which are set in the encoders 20-n, with each of the discrepancies corresponding to the sending delay $T_{dr}$. Accordingly, as indicated by S115 to S121, the encoders 20-n obtain the motor position information at the same timing, namely, at the position obtainment timing t8.

In obtaining the motor position information for the second and later times, the controller 10 may incorporate the starting point information in the motor position information obtainment command every time the controller 10 obtains the motor position information. Alternatively, as in embodiment 4, the controller 10 may obtain the motor position information in every communication cycle $T_{cc}$, without sending and receiving the motor position information obtainment command. When the controller 10 incorporates the starting point information in the motor position information obtainment command every time the controller 10 obtains the motor position information, the controller 10 may initialize the time information at a predetermined timing (for example, the start timing of the communication cycle $T_{cc}$ and the position obtainment timing), every time the controller 10 obtains the motor position information.

In embodiment 5, the encoders 20-n obtain the motor position information based on a timing specified by the controller 10, not based on the timing of receiving the initialization command or the timing of receiving the motor position information obtainment command. This configuration ensures that the position obtainment timings of the encoders 20-n match.

While in embodiment 5 the starting point information is included in the motor position information obtainment command, the starting point information may be included in the initialization command. In this case, the encoders 20-$n$ obtain the motor position information at a waiting timing corresponding to the wait time period $T_{wn}$ after the timing indicated by the starting point information included in the initialization command. In obtaining the motor position information for the second and later times, the encoders 20-$n$ obtain the motor position information in every communication cycle $T_{CC}$, similarly to embodiment 4. This configuration ensures that the second and later position obtainment timings of the encoders 20-$n$ match. In embodiment 5, the motor position information obtainer 207-$n$ may obtain the motor position information at a timing determined by the initialization command or the motor position information obtainment command and at a timing that is based on the wait time period $T_{wn}$. Insofar as this configuration is employed, the timing determined by the initialization command or the motor position information obtainment command may correspond to the timing at which the value that the count-up timer tells is zero. In this case, the wait time period $T_{wn}$ indicates the position obtainment timing of each encoder 20-$n$.

6. Other Modifications

Figure 13:
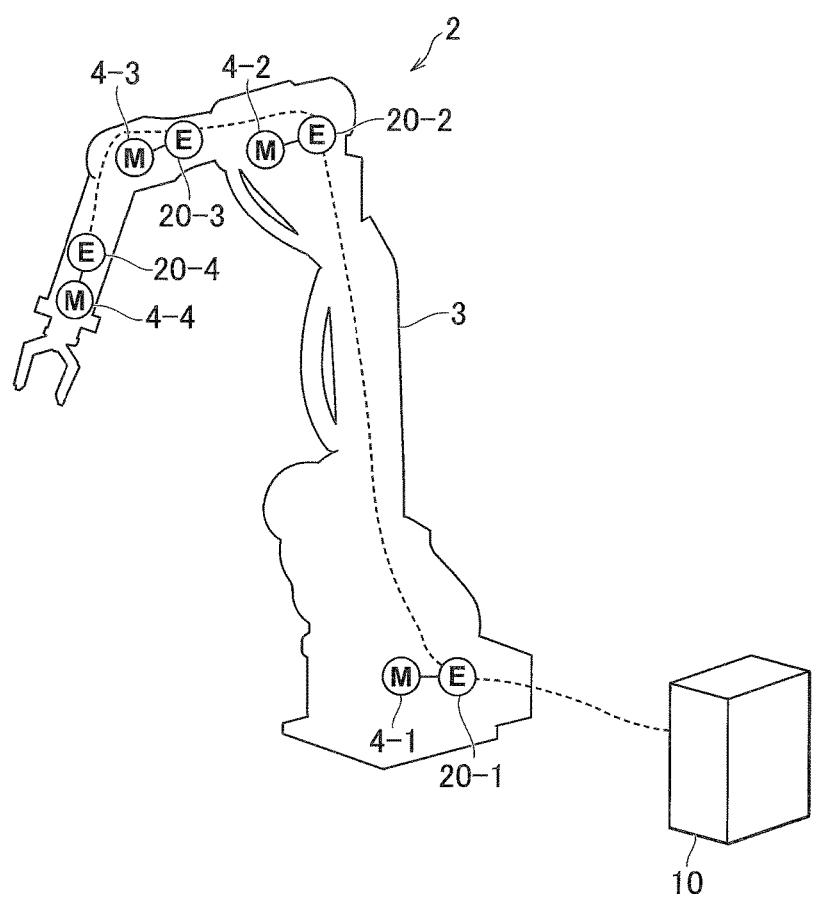
FIG. 13 illustrates an exemplary robot system.

The processings described above may be applied to robot systems. FIG. 13 illustrates an exemplary robot system. As illustrated in FIG. 13, a robot system 2 includes the motor control system 1 and a robot 3. The robot 3 is controlled by the controller 10, and includes a plurality of motors 4. The motors 4 are built in the robot 3. In the example illustrated in FIG. 13, the robot 3 includes a manipulator with an arm. Also in this example, the robot 3 is a concept that encompasses multi-axial machines (for example, converting machines for metals), which have equal to or more than two axes. The robot 3 illustrated in FIG. 13 includes four motors 4-1 to 4-4 and therefore is a four-axis machine.

In the robot system 2, the controller 10 instructs the motors 4-1 to 4-4 to turn so as to operate the robot 3. For example, the controller 10 controls the motors 4-1 to 4-4 to turn so as to make the arm of the robot 3 hold an object at a predetermined position and at a predetermined timing. In this example, the encoders 20-1 to 20-4 are respectively connected to the motors 4-1 to 4-4. As indicated by the broken line in FIG. 13, the encoders 20-1 to 20-4 are connected to each other in a daisy-chain configuration. In this example, the encoder 20-1 is the uppermost-level encoder and the encoder 20-4 is the lowermost-level encoder. In FIG. 13, other wirings and auxiliary equipment are omitted.

In the robot system 2, the processings described in one, some, or all of embodiments 1 to 4 may be performed. Specifically, embodiment 1 may be employed in the robot system 2 by making the position obtainment timings of the encoders 20-1 to 20-4 match. Embodiment 2 may be employed in the robot system 2 by sending data by the cut-through method or the store-and-forward method. Embodiment 3 may be employed in the robot system 2 by keeping and releasing sending enabling state. Embodiment 4 may be employed in the robot system 2 by making the position obtainment timings match without sending or receiving the motor position information obtainment command.

Also in the robot system 2, the upper-level connection port 24-$n$ and the lower-level connection port 25-$n$ may not necessarily be directly connected to the transmission paths 30-$n$, but may be indirectly connected to the transmission paths 30-$n$. A non-limiting example of the indirect connection is that cables, communication connectors, and other elements that are directly connected to the upper-level connection port 24-$n$ and the lower-level connection port 25-$n$ are implemented as an entity separate from the encoders 20-$n$, and an input portion of a signal line from the separate entity is connected to the upper-level connection port 24-$n$ and the lower-level connection port 25-$n$. This configuration also applies in the connection port 14 of the controller 10.

The controller 10 may be separate from the motor controller (servo controller or servo amplifier) or may incorporate the motor controller. Another possible example is that the communication end(s) of the encoders 20-$n$ is one or a plurality of motor controllers, and that the one or the plurality of motor controllers is controlled by another upper-level device. That is, the controller 10 may include both the motor controller and the upper-level device that controls the motor controller. Alternatively, the motor controller may be separate from the upper-level device. In the case where the motor controller is separate from the upper-level device, the motor controller may correspond to the controller recited in the appended claims, or the upper-level device that controls the motor controller may correspond to the controller recited in the appended claims.

In embodiments 1 to 4, the motor control system 1 incorporates the controller 10 and the encoders 20-$n$. Another possible embodiment is that the motor control system 1 incorporates other apparatuses, machines, or devices. Specifically, the motor control system 1 may not only incorporate the controller 10 and the encoders 20-$n$ but also incorporate motors and motor control systems.

The number of connections in the daisy-chain configuration will not be limited to four or seven. Any other number of connections equal to or more than two is possible. In embodiment 1, the wait time period $T_{wn}$ may not necessarily be set at the initialization time. The wait time period $T_{wn}$ may be set at any other time after the power source is on.

The motor position information that the controller 10 receives includes information to identify the encoder 20-$n$ from which the motor position information has been obtained. The motor position information may not necessarily include this information. In this case, the encoders 20-$n$ may send their respective pieces of motor position information to the controller 10 in a predetermined order, and the controller 10 may use the predetermined order to identify the encoder 20-$n$ from which a piece of motor position information has been obtained.

Based on a command (for example, the motor position information obtainment command or the initialization command), the motor position information obtainer 207-$n$ may obtain the motor position information at a timing that matches the timing at which the other encoder 20-$n$ connected to the encoder 20-$n$ of the motor position information obtainer 207-$n$ (in the daisy-chain configuration) obtains the motor position information. Insofar as this configuration is employed, the method of making the position obtainment timings of the encoders 20-$n$ match will not be limited to the above-described methods. Further, setting the wait time period $T_{wn}$ should not be construed in a limiting sense. Another possible embodiment is to obtain the motor position information at a predetermined point of time.

The initialization command sender 102 makes the encoder 20-$n$ of the initialization command sender 102 obtain the motor position information at a timing that matches the timing at which the other encoder 20-$n$ connected to the encoder 20-$n$ of the initialization command sender 102 (in the daisy-chain configuration) obtains the motor position information. Insofar as this configuration is employed, incorporating the wait time period data in the initialization command should not be construed in a limiting sense. Another possible embodiment is to send to the encoders 20-$n$ the time to obtain the motor position information.

The encoder 20-$n$ has been described as an example of the sensor recited in the appended claims, and the motor position information has been described as an example of the motor-related information recited in the appended claims. The sensor may be applied to various other sensors than the encoder 20-$n$ that obtain any motor-related information. Another possible example of the sensor recited in the appended claims is a torque detection sensor that detects torque of a motor. In this case, a plurality of torque detection sensors are connected to each other in a daisy-chain configuration, and torque information indicating the torque of the motor corresponds to the motor-related information recited in the appended claims.

Other possible examples of the sensor recited in the appended claims include an acceleration sensor and an inner-force sensor. In this case, a plurality of acceleration sensors or a plurality of inner-force sensors are connected to each other in a daisy-chain configuration, and acceleration information indicating acceleration of a motor and pressure information indicating pressure of an arm operated by the motor correspond to the motor-related information recited in the appended claims.

That is, the sensor recited in the appended claims is a sensor that obtains motor-related information, which relates to a motor. Accordingly, the "motor position information" described in embodiments 1 to 4 and the above-described modifications can be rephrased as "motor-related information". In a non-limiting embodiment, the plurality of sensors in the daisy-chain connection may be different from each other in type. For example, the above-described processings may be applied to a daisy-chain connection of an encoder, a torque detection sensor, an acceleration sensor, and an inner-force sensor.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A sensor comprising:
    an upper-level connection port configured to communicate with an upper-level sensor or an upper-level controller;
    a lower-level connection port configured to communicate with a lower-level sensor;
    a command receiver configured to receive a command from the upper-level controller;
    a wait time period setter configured to set a wait time period based on an order of connection of at least the upper-level sensor or the upper-level controller, the sensor, and the lower-level sensor;
    a motor-related information obtainer configured to obtain motor-related information, which relates to a motor, at a timing determined by the command and at a timing based on the wait time period; and
    a command re-sender configured to send, through the lower-level connection port, the command that is being received by the command receiver before the command receiver finishes receiving the command.

2. The sensor according to claim 1, wherein the command comprises a motor-related information obtainment command.

3. The sensor according to claim 2, further comprising an initialization command receiver configured to receive an initialization command from the upper-level controller,
    wherein the wait time period setter is configured to set the wait time period based on the initialization command.

4. The sensor according to claim 3, wherein the wait time period setter is configured to set the wait time period based on a specified wait time period included in the initialization command.

5. The sensor according to claim 1, wherein the wait time period setter is configured to set the wait time period such that a timing at which the motor-related information obtainer obtains the motor-related information is after a lowermost-level sensor has finished receiving the command.

6. The sensor according to claim 2, further comprising:
    a lower-level motor-related information receiver configured to receive lower-level motor-related information from the lower-level connection port; and
    a motor-related information sender configured to send the motor-related information through the upper-level connection port and configured to send the lower-level motor-related information through the upper-level connection port after the motor-related information sender has finished sending the motor-related information.

7. The sensor according to claim 6,
    wherein the command re-sender is configured to send, through the lower-level connection port and by a cut-through method, the command received by the command receiver, and
    wherein the motor-related information sender is configured to send the lower-level motor-related information through the upper-level connection port and by a store-and-forward method.

8. The sensor according to claim 6, wherein a motor-related information obtainment command communication time period for which the motor-related information and the lower-level motor-related information are sent and received is longer than a motor-related information communication time period for which the motor-related information obtainment command is sent and received.

9. The sensor according to claim 6, wherein the motor-related information sender is configured to remove a preamble header of the lower-level motor-related information and configured to send the lower-level motor-related information following the motor-related information.

10. A controller comprising:
    a connection port configured to communicate with a sensor, the sensor comprising:
        an upper-level connection port configured to communicate with an upper-level sensor or an upper-level controller;
        a lower-level connection port configured to communicate with a lower-level sensor;
        a command receiver configured to receive a command from the upper-level controller;
        a wait time period setter configured to set a wait time period based on an order of connection of at least the upper-level sensor or the upper-level controller, the sensor, and the lower-level sensor; and
        a motor-related information obtainer configured to obtain motor-related information, which relates to a motor, at a timing determined by the command and at a timing based on the wait time period; and an initialization command sender configured to send an initialization command to the connection port, the initialization command comprising information to set the wait time period, wherein the information to set the wait time period comprises a wait time period determined based on the order of connection for each of the sensor, the upper-level sensor, and the lower-level sensor, and wherein the controller further comprises a wait time period calculator configured to calculate, for each of the sensor, the upper-level sensor, and the lower-level sensor, the wait time period based on the order of connection, a delay in sending the command, a time period for sending and receiving the command, and a command communication time period that is determined based on a maximum connection number of the sensor, the upper-level sensor, and the lower-level sensor.

11. A sensor comprising:

an upper-level connection port configured to communicate with an upper-level sensor or an upper-level controller;

a lower-level connection port configured to communicate with a lower-level sensor;

a command receiver configured to receive a command from the upper-level controller;

a wait time period setter configured to set a wait time period based on an order of connection of at least the upper-level sensor or the upper-level controller, the sensor, and the lower-level sensor; and a motor-related information obtainer configured to obtain motor-related information, which relates to a motor, at a timing determined by the command and at a timing based on the wait time period, wherein the command comprises a motor-related information obtainment command, wherein the upper-level connection port comprises a lower-level motor-related information receiver connected to the upper-level sensor or the upper-level controller by a half-duplex communication system and configured to receive lower-level motor-related information from the lower-level connection port, a motor-related information sender configured to send the motor-related information and the lower-level motor-related information through the upper-level connection port, and an enabling holder configured to, after the motor-related information sender has finished sending the motor-related information and the lower-level motor-related information, keep the upper-level connection port in a sending enabling state for a predetermined period of time.

12. The sensor according to claim 11, wherein the enabling holder is configured to release the sending enabling state at least until the command receiver receives the motor-related information obtainment command.

13. A method for obtaining motor-related information, the method comprising:

receiving a command from an upper-level controller through an upper-level connection port of a sensor;

setting a wait time period based on an order of connection of at least an upper-level sensor or the upper-level controller, the sensor, and a lower-level sensor;

obtaining motor-related information, which relates to a motor, at a timing determined by the command and at a timing based on the wait time period; and sending the command through a lower-level connection port of the sensor before the command finishes being received.

14. The method according to claim 13, further comprising sending, to a connection port of the upper-level controller, an initialization command comprising information to set the wait time period.

15. The method according to claim 13, further comprising:

receiving lower-level motor-related information from the lower-level connection port; and sending the lower-level motor-related information through the upper-level connection port after the motor-related information has finished being sent.

16. A method for obtaining motor-related information, the method comprising:

receiving a command from an upper-level controller through an upper-level connection port of a sensor;

setting a wait time period based on an order of connection of at least an upper-level sensor or the upper-level controller, the sensor, and a lower-level sensor; and obtaining motor-related information, which relates to a motor, at a timing determined by the command and at a timing based on the wait time period, wherein the upper-level connection port is connected to the upper-level sensor or the upper-level controller by a half-duplex communication system, configured to receive lower-level motor-related information from the lower-level connection port, configured to send the motor-related information and the lower-level motor-related information through the upper-level connection port, and configured to, after the motor-related information and the lower-level motor-related information have finished being sent, keep the upper-level connection port in a sending enabling state for a predetermined period of time.

* * * * *